No. 654,181. Patented July 24, 1900.
F. C. RINSCHE.
CALCULATING MACHINE.
(Application filed Apr. 2, 1900.)
(No Model.) 19 Sheets—Sheet 1.

Attest.
George Bakewell
Wm H Ford

Inventor:
Frank C. Rinsche
by Bakewell & Cornwall
Attys.

No. 654,181. Patented July 24, 1900.
F. C. RINSCHE.
CALCULATING MACHINE.
(Application filed Apr. 2, 1900.)
(No Model.) 19 Sheets—Sheet 3.

Attest:
George Bakewell

Inventor:
Frank C. Rinsche
by Bakewell & Cornwall
Attys.

No. 654,181. Patented July 24, 1900.
F. C. RINSCHE.
CALCULATING MACHINE.
(Application filed Apr. 2, 1900.)

(No Model.) 19 Sheets—Sheet 5.

Attest:
George Bakewell
Wm H Scott

Inventor:
Frank C. Rinsche
by Bakewell & Cornwall
Att'ys.

No. 654,181.  
F. C. RINSCHE.  
CALCULATING MACHINE.  
(Application filed Apr. 2, 1900.)
Patented July 24, 1900.
(No Model.)
19 Sheets—Sheet 6.
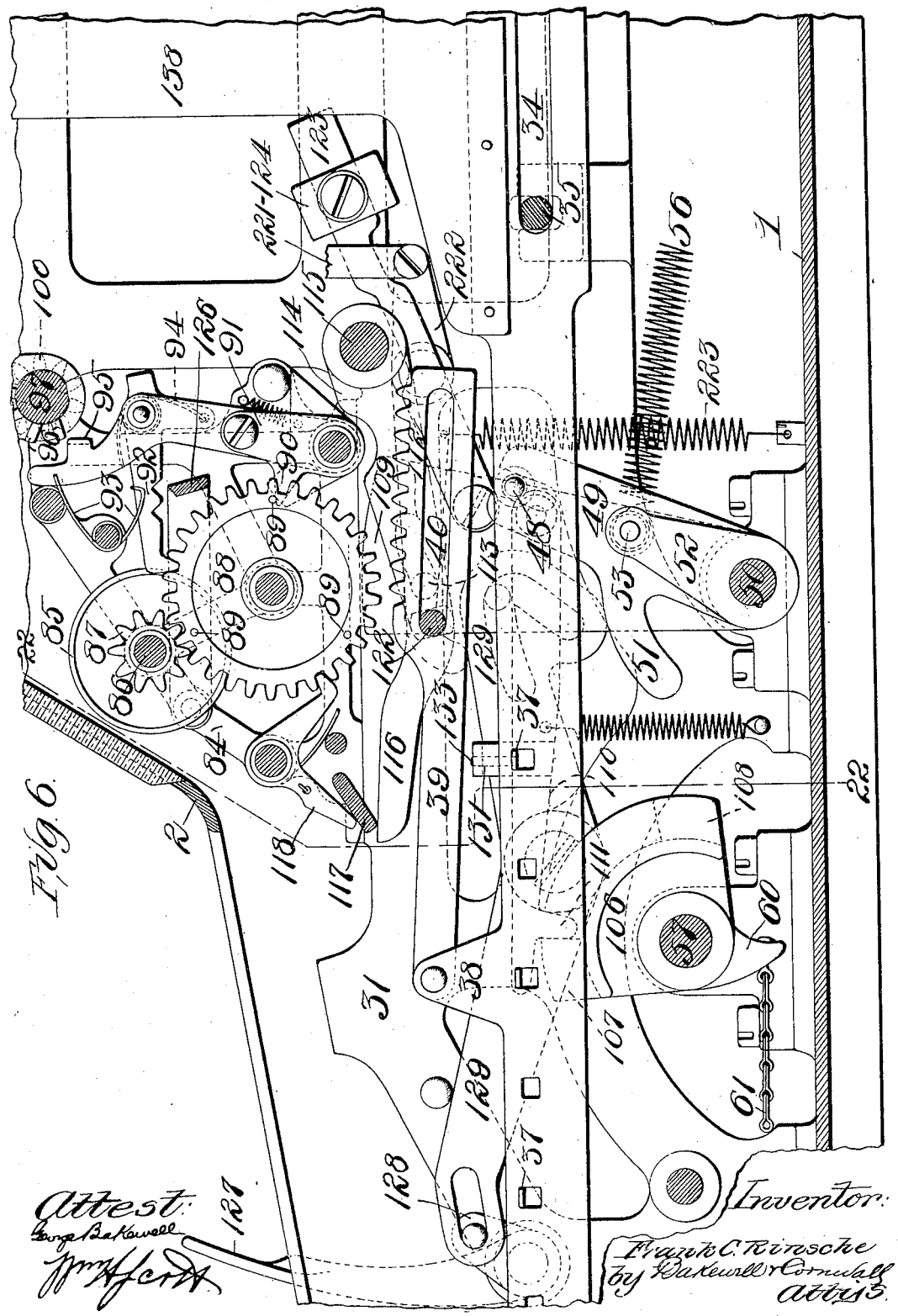
Attest:  
George Bakewell  
Wm H Ford
Inventor:  
Frank C. Rinsche  
by Bakewell & Cornwall  
Attys

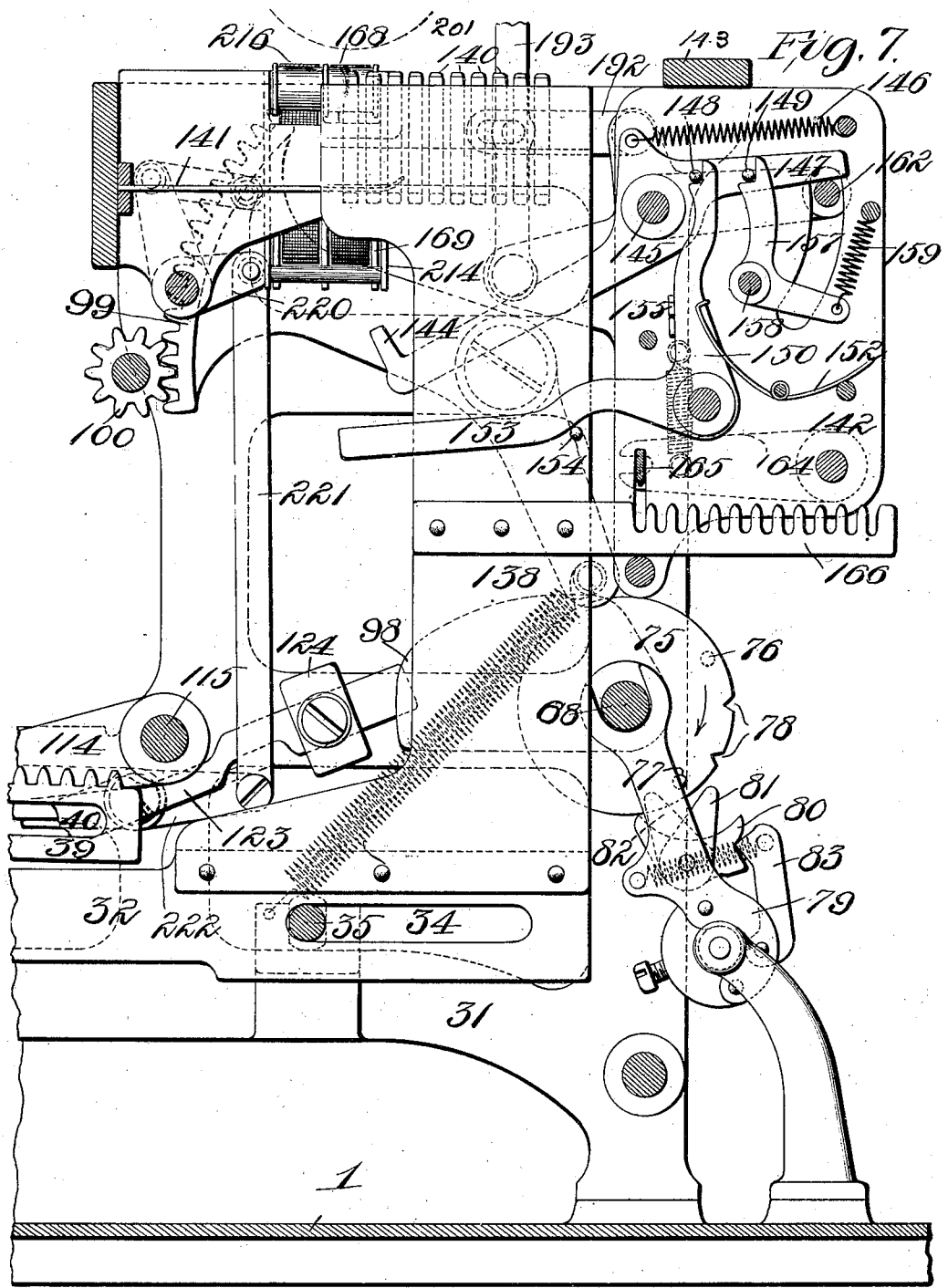

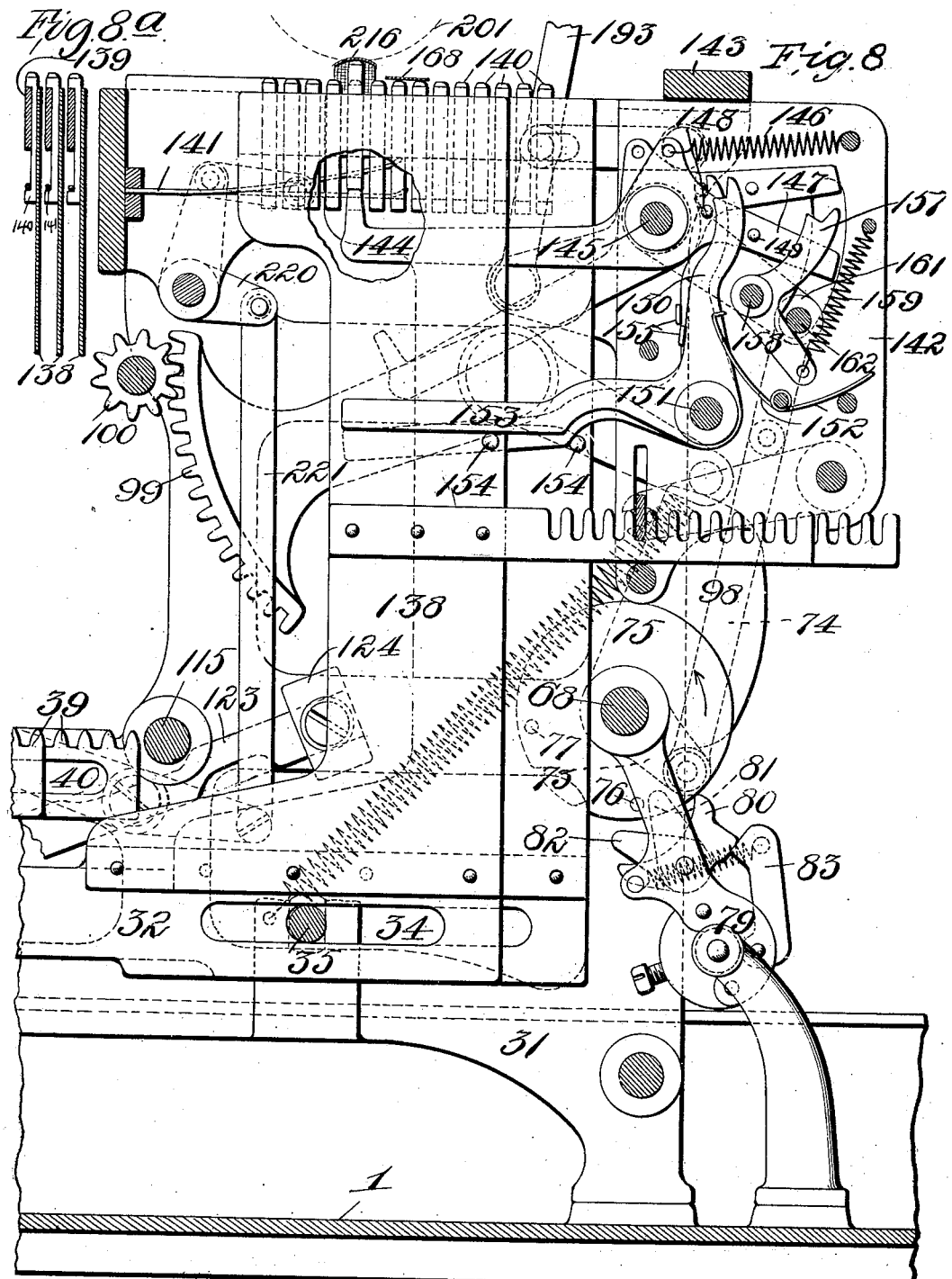

No. 654,181. Patented July 24, 1900.
F. C. RINSCHE.
CALCULATING MACHINE.
(Application filed Apr. 2, 1900.)
(No Model.) 19 Sheets—Sheet 9.
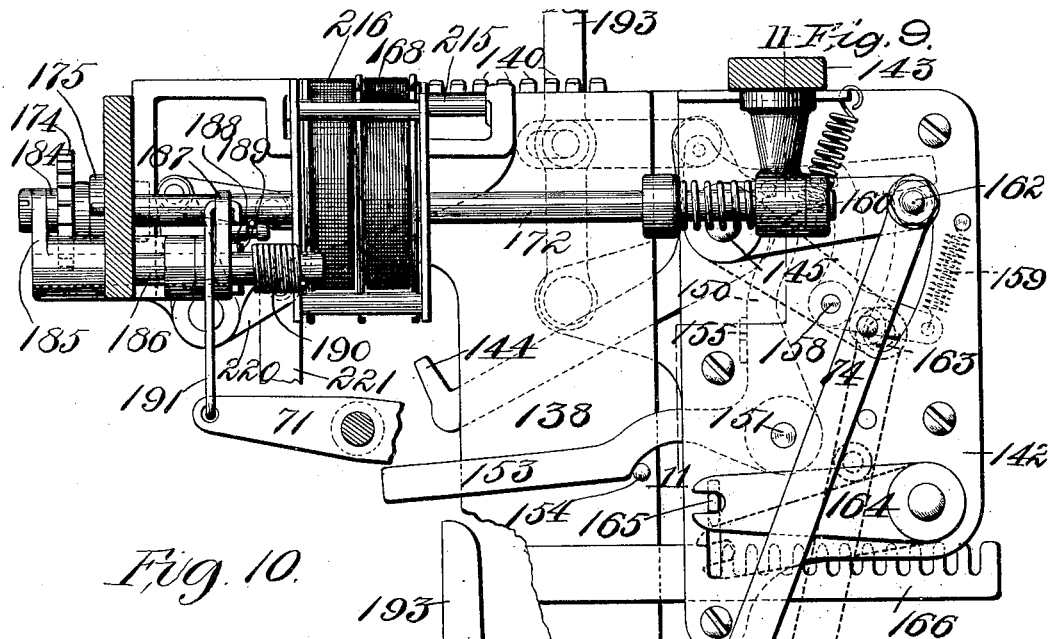
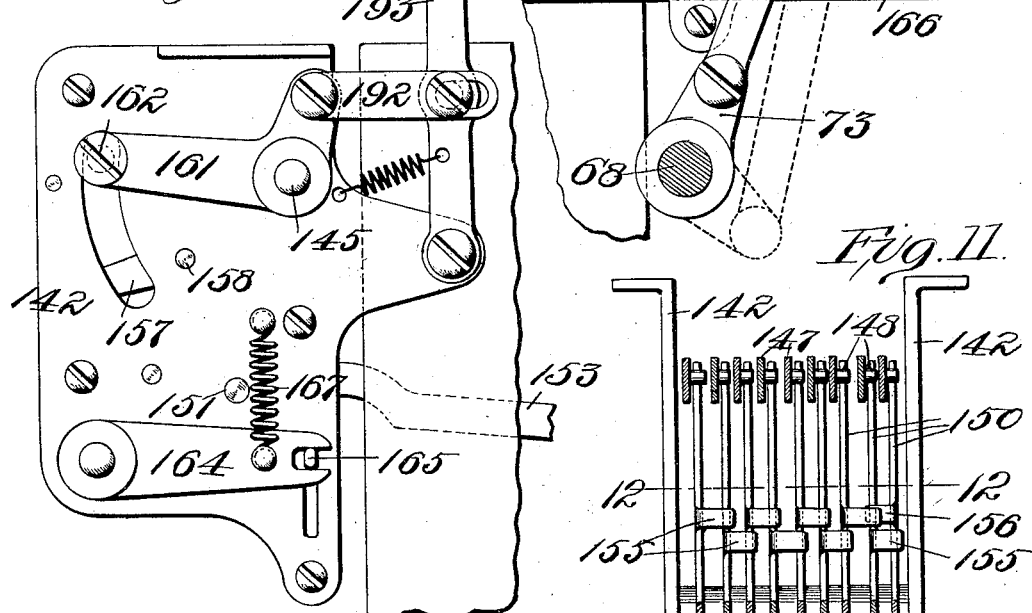
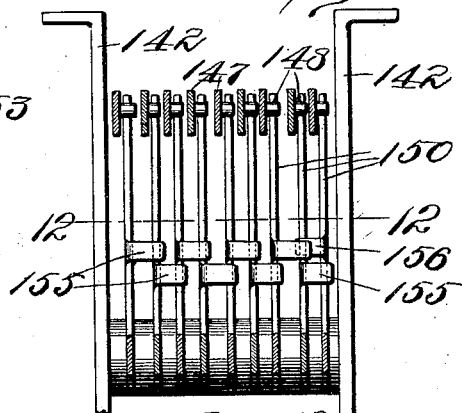
Inventor:
Frank C. Rinsche
by Bakewell & Cornwall
Atty's.
Attest:
George Bakewell
Wm. H. ford No. 654,181.  
F. C. RINSCHE  
CALCULATING MACHINE.  
(Application filed Apr. 2, 1900.)  
Patented July 24, 1900.

(No Model.)  
19 Sheets—Sheet 10.

Fig. 13

Attest:  
George Bakewell  
Wm H Scott

Inventor:  
Frank C. Rinsche  
by Bakewell & Cornwall  
Att'ys.

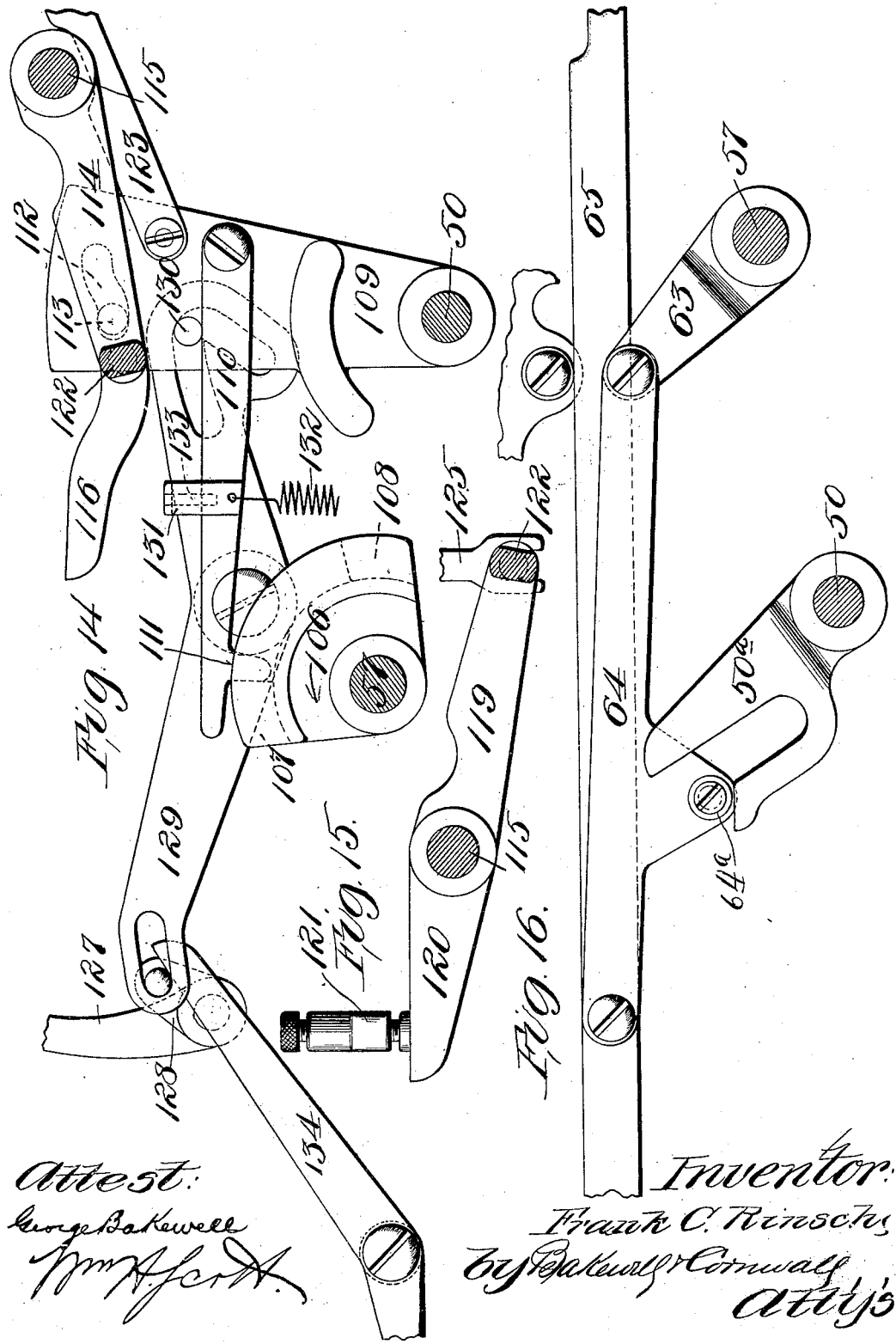

No. 654,181. Patented July 24, 1900.
F. C. RINSCHE.
CALCULATING MACHINE.
(Application filed Apr. 2, 1900.)
(No Model.) 19 Sheets—Sheet 12.
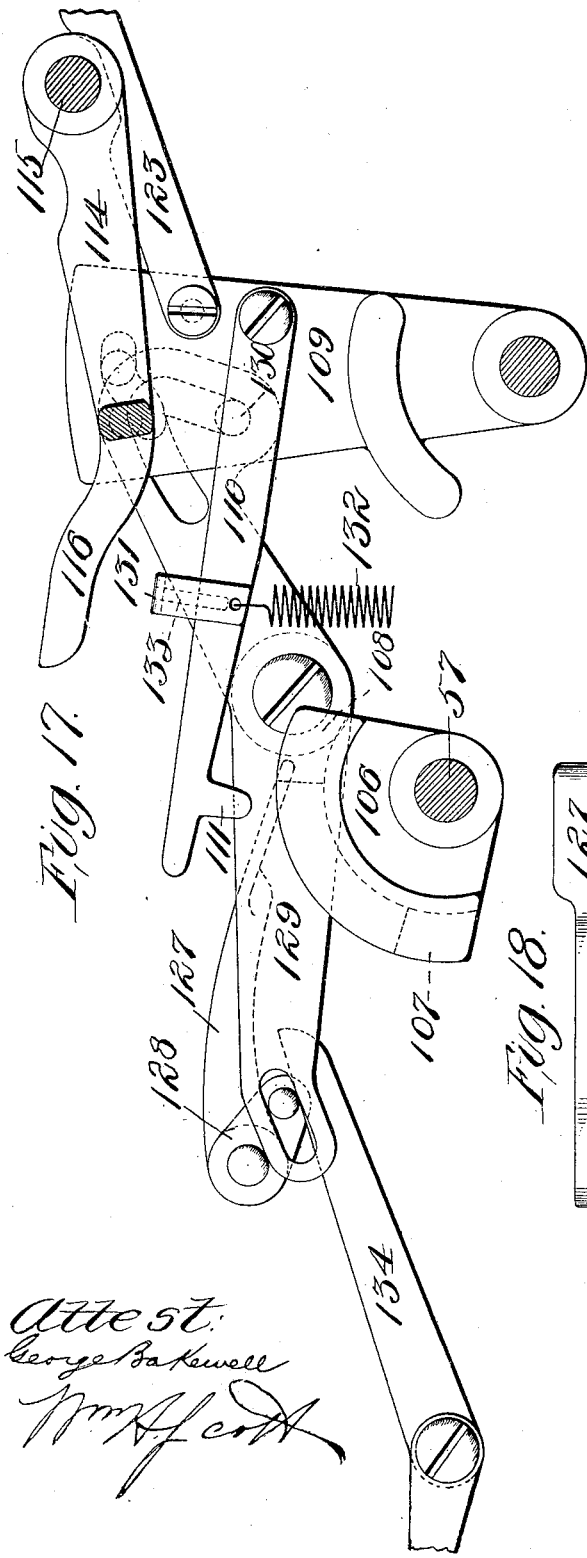
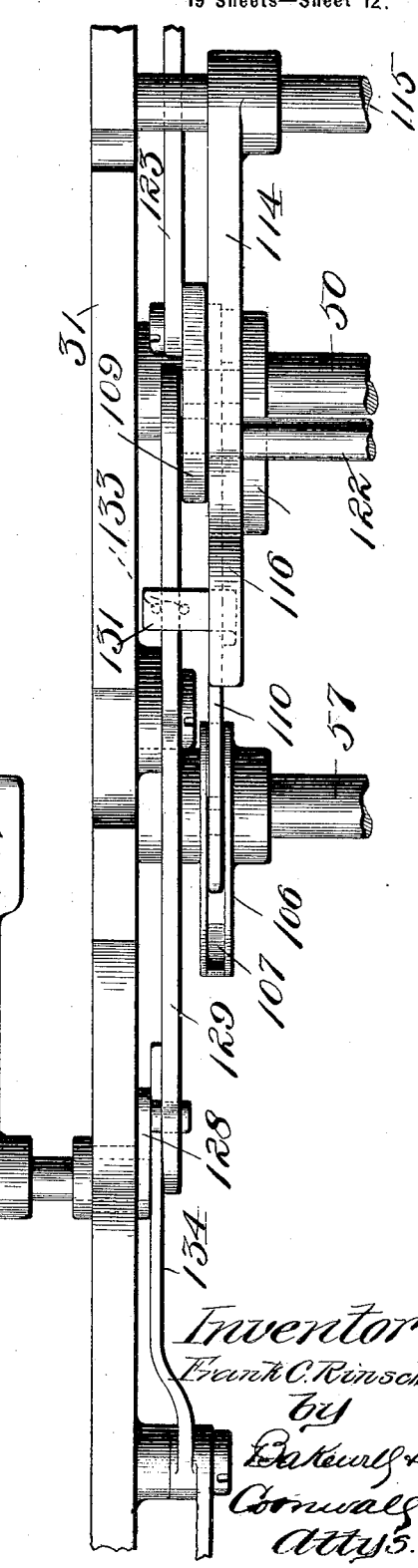

No. 654,181. Patented July 24, 1900.
F. C. RINSCHE.
CALCULATING MACHINE.
(Application filed Apr. 2, 1900.)
(No Model.) 19 Sheets—Sheet 13.
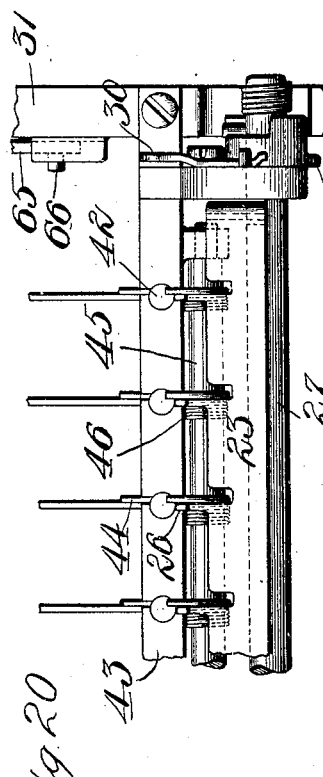
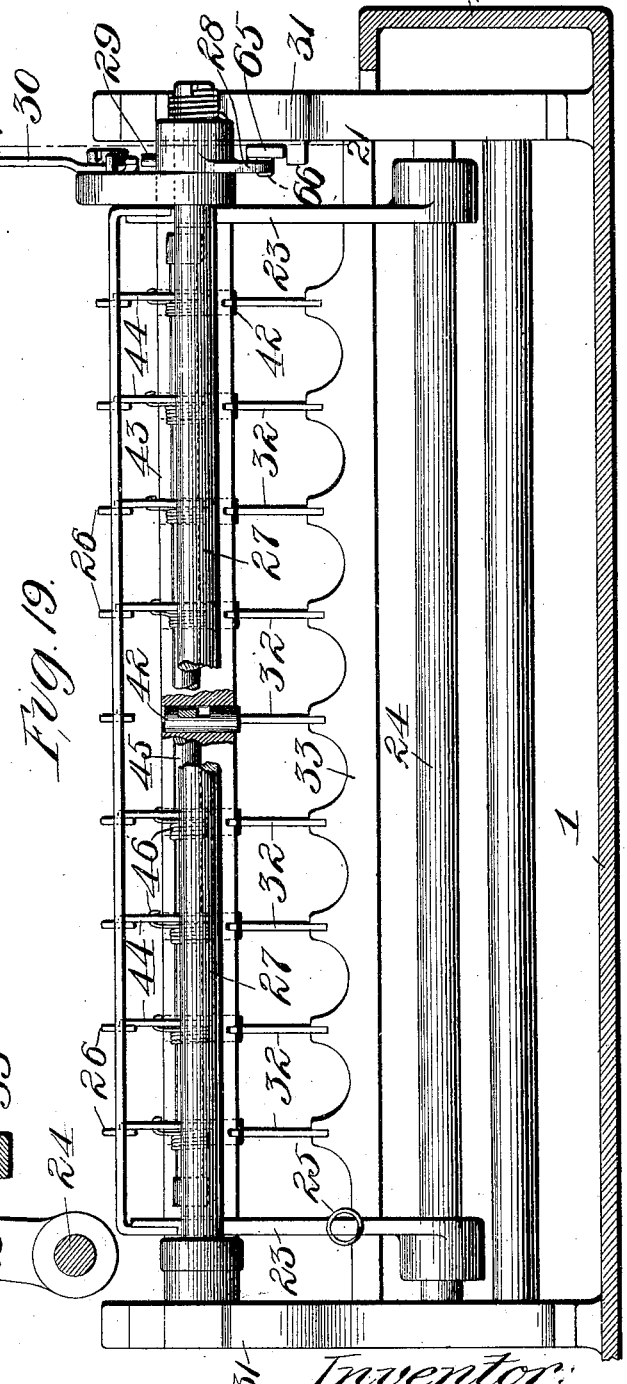
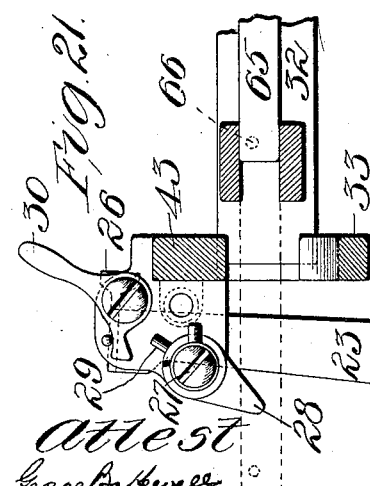

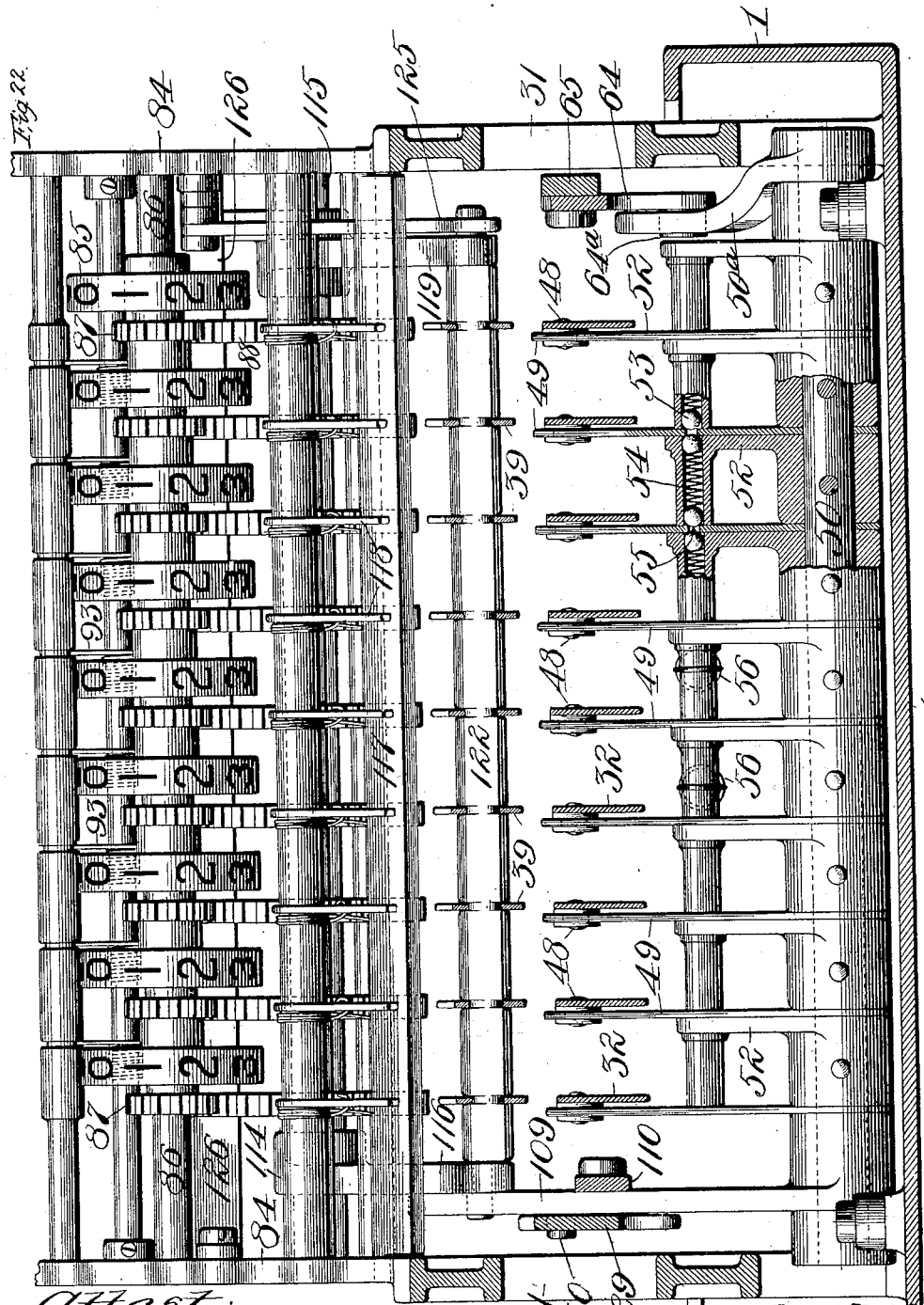

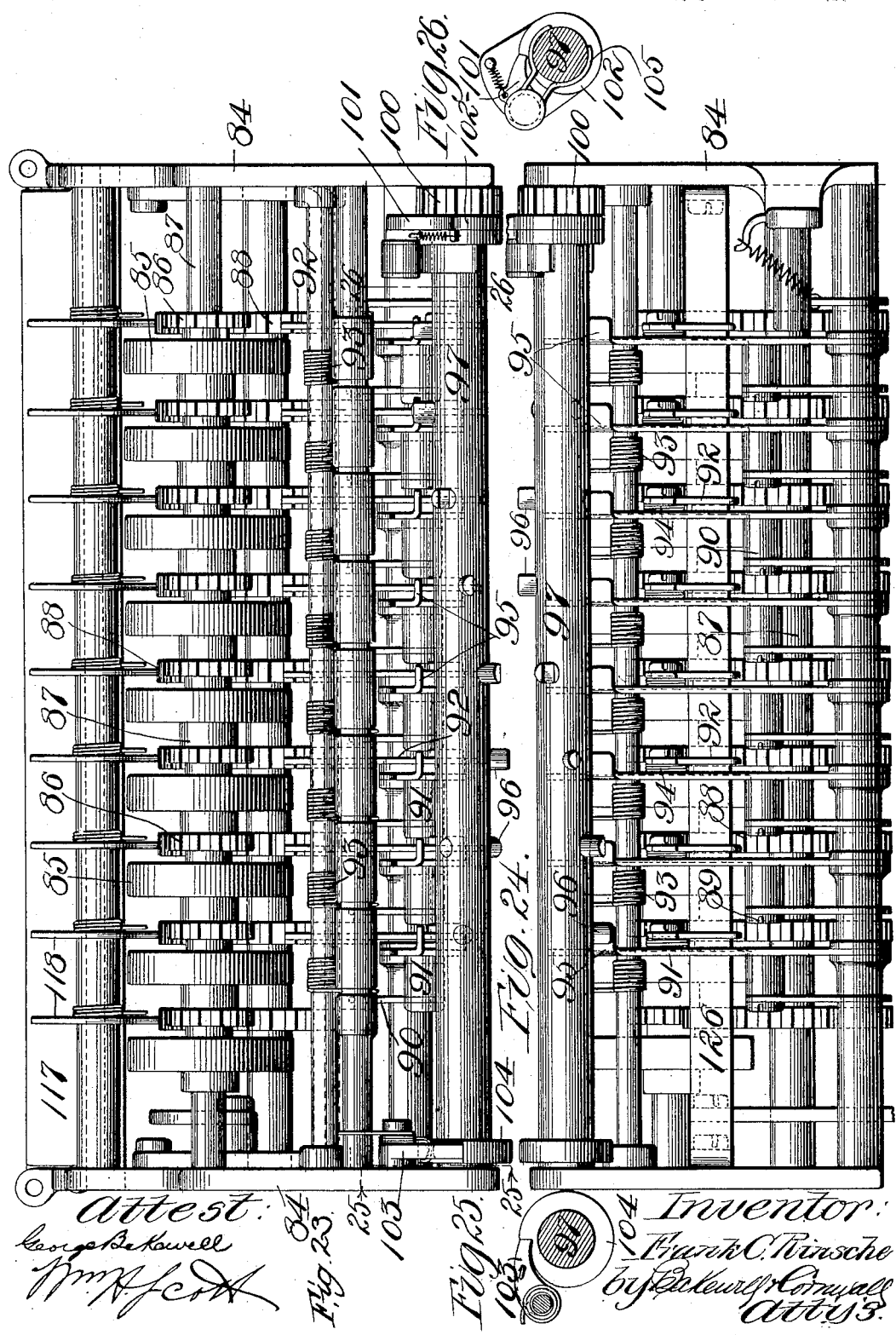

No. 654,181. Patented July 24, 1900.
F. C. RINSCHE.
CALCULATING MACHINE.
(Application filed Apr. 2, 1900.)
(No Model.) 19 Sheets—Sheet 16.
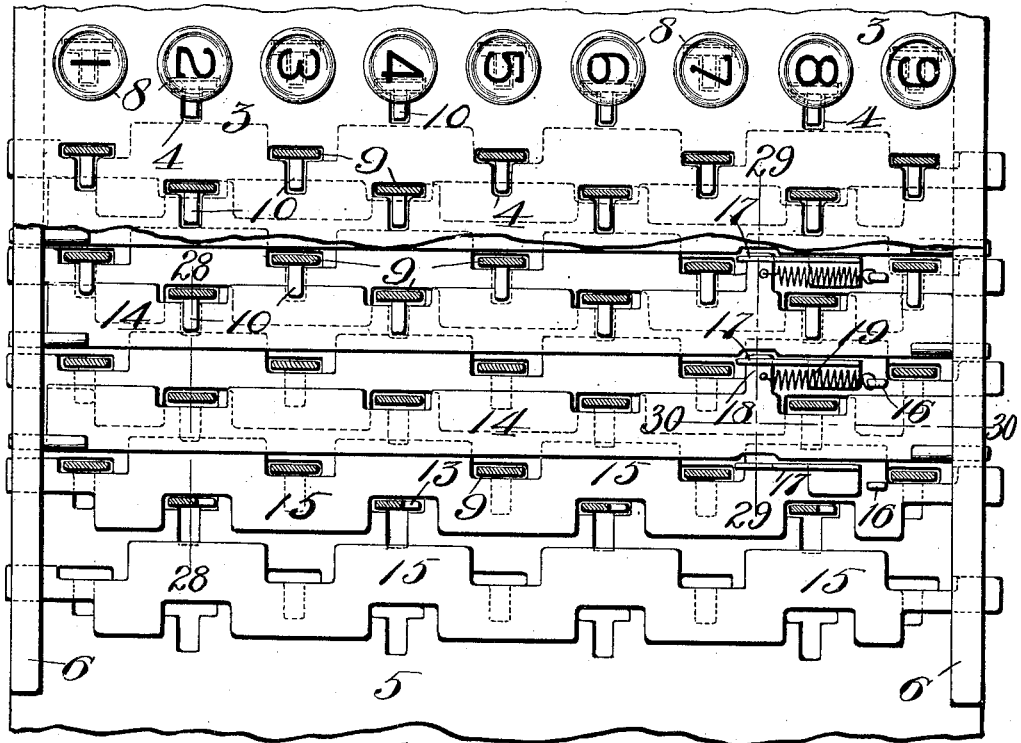
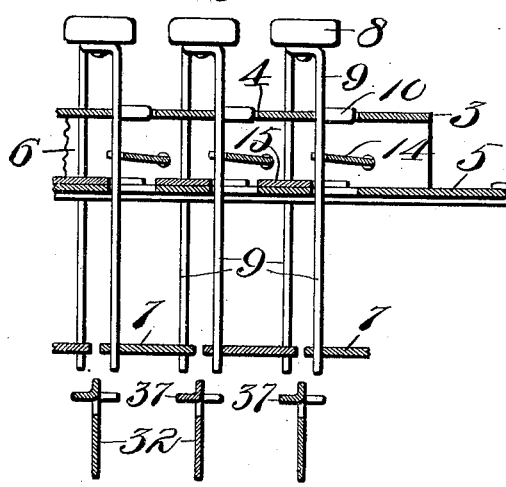
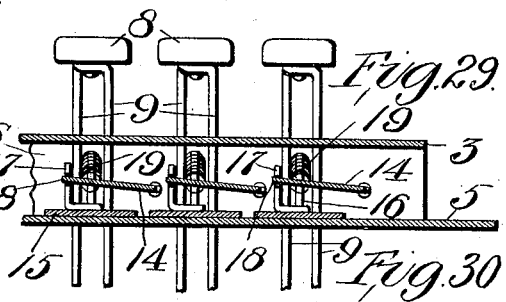
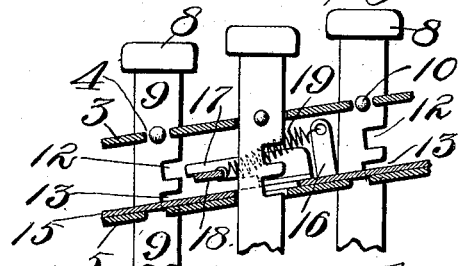
Attest:
George Bakewell
Inventor:
Frank C. Rinsche
by Bakewell & Cornwall
Atty's.

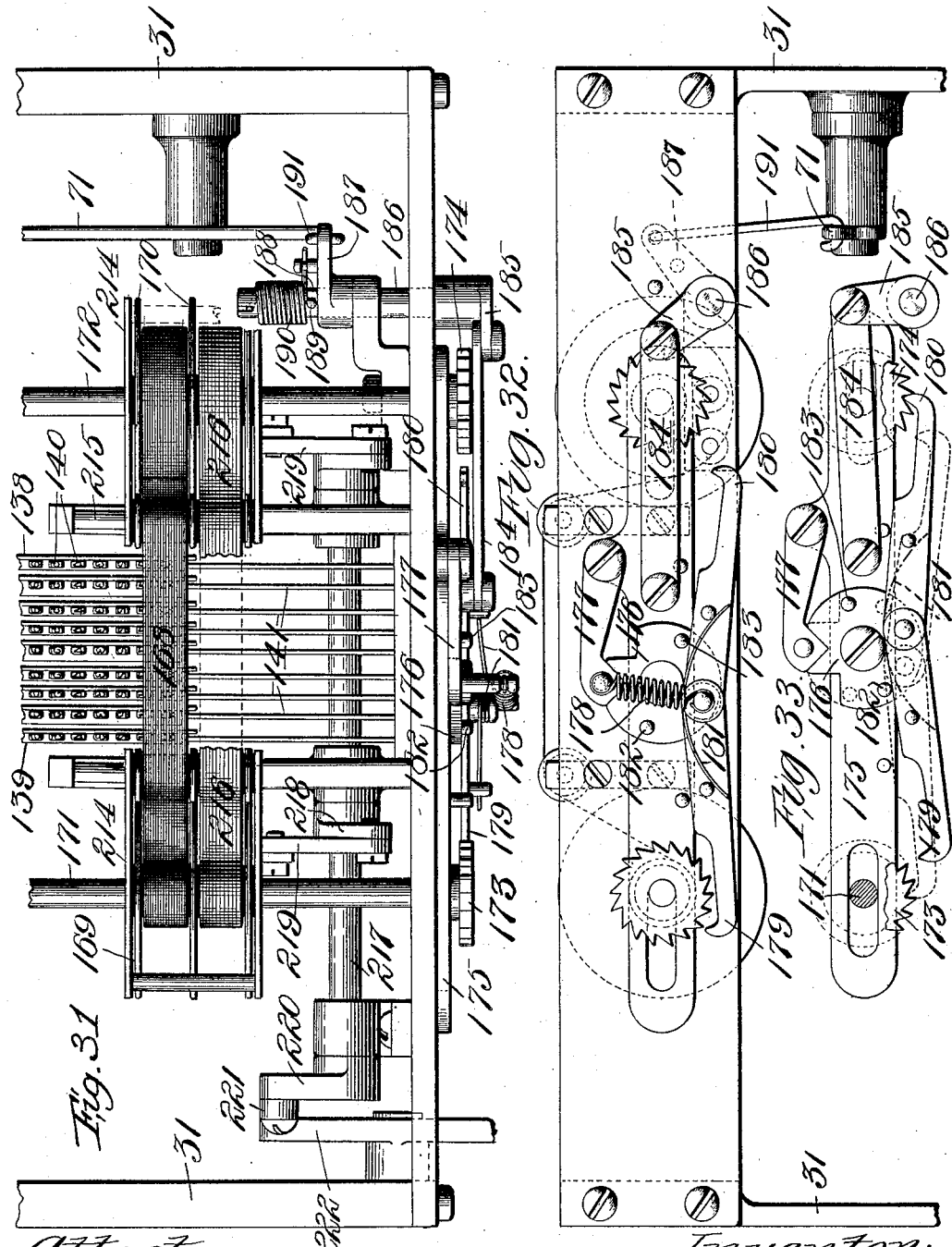

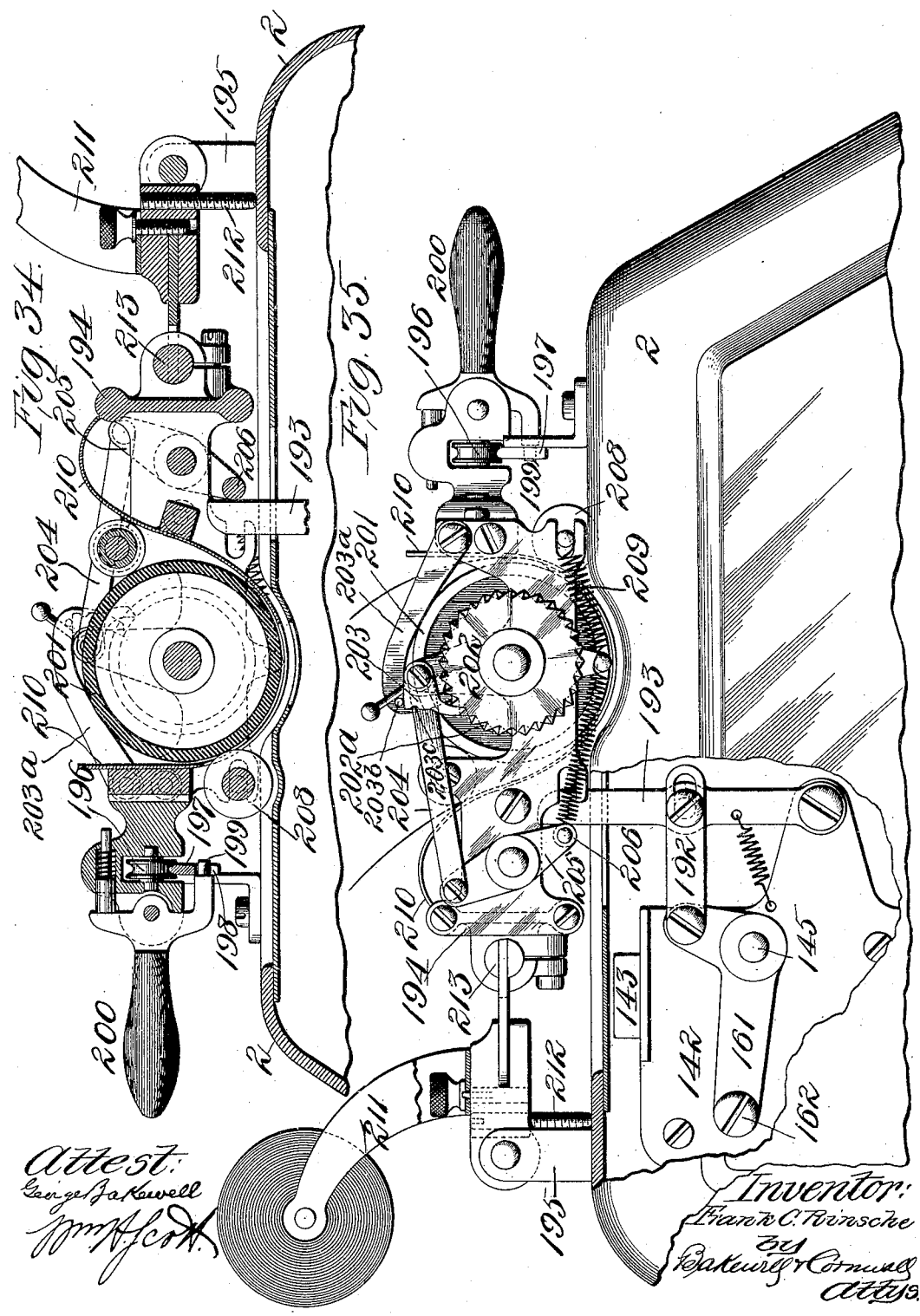

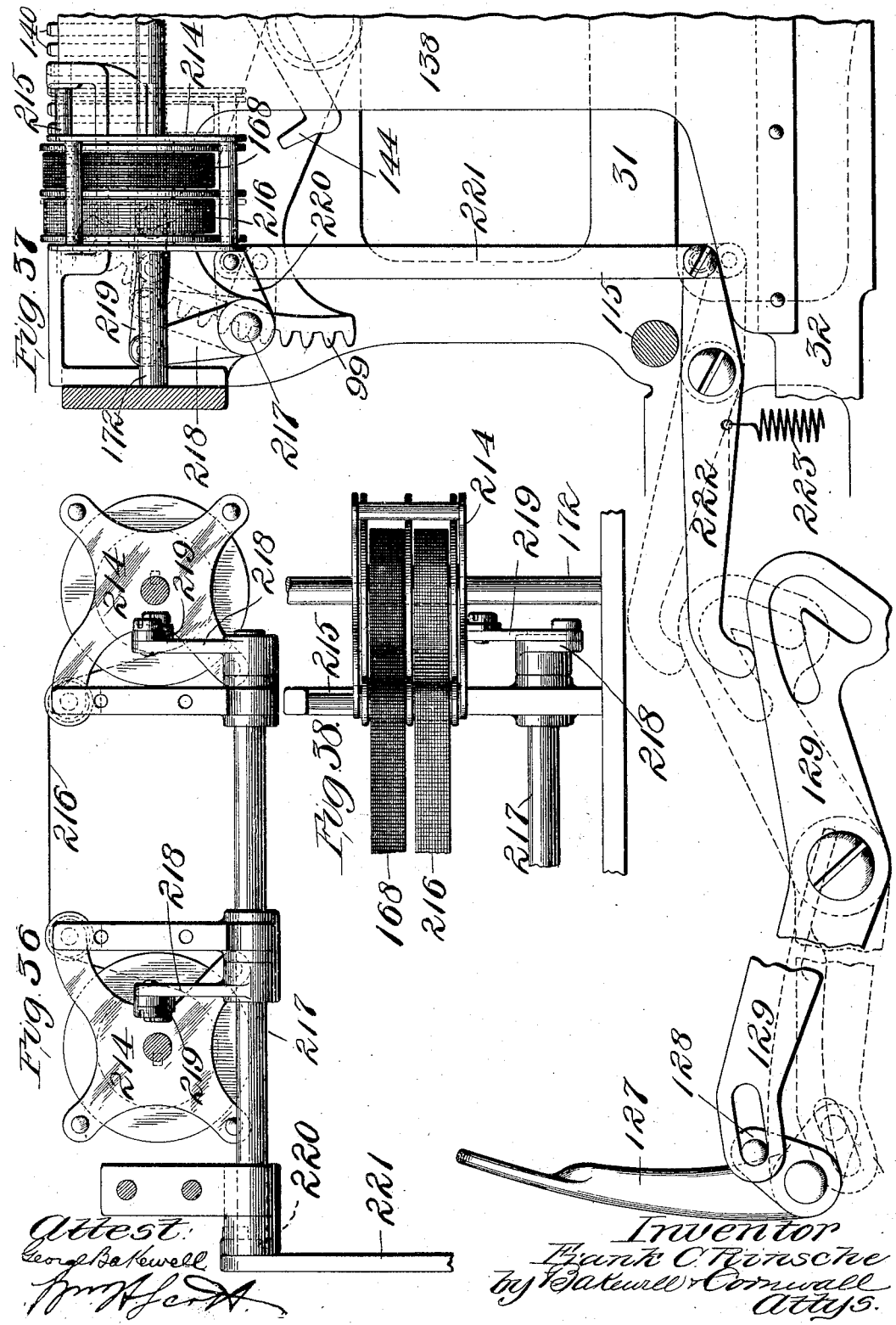

UNITED STATES PATENT OFFICE.

FRANK C. RINSCHE, OF ST. LOUIS, MISSOURI, ASSIGNOR TO THE UNIVERSAL ACCOUNTANT MACHINE COMPANY, OF SAME PLACE.

CALCULATING-MACHINE.

SPECIFICATION forming part of Letters Patent No. 654,181, dated July 24, 1900.

Application filed April 2, 1900. Serial No. 11,125. (No model.)

*To all whom it may concern:*

Be it known that I, FRANK C. RINSCHE, a citizen of the United States, residing at the city of St. Louis, in the State of Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1:
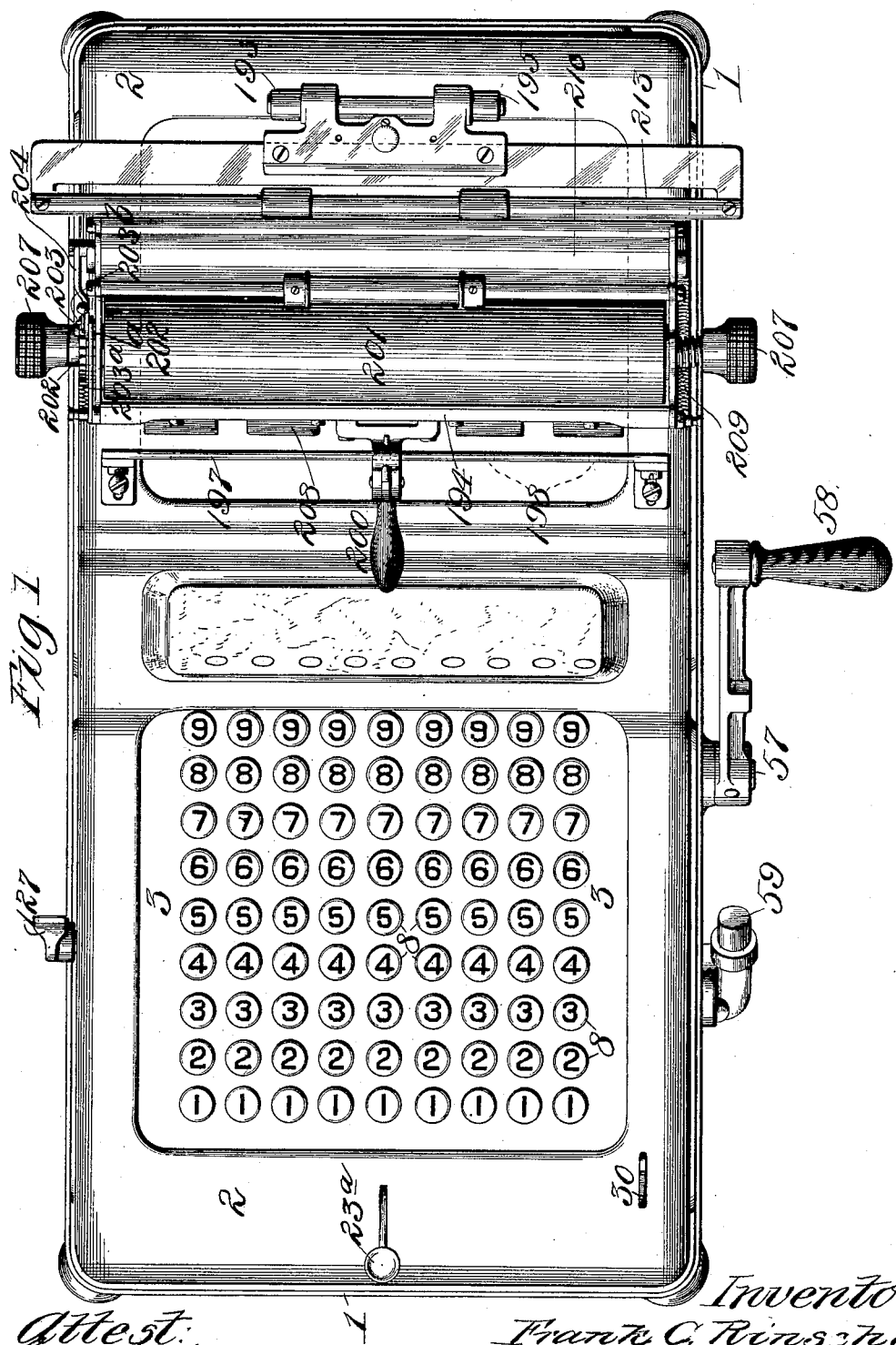
Figure 2:
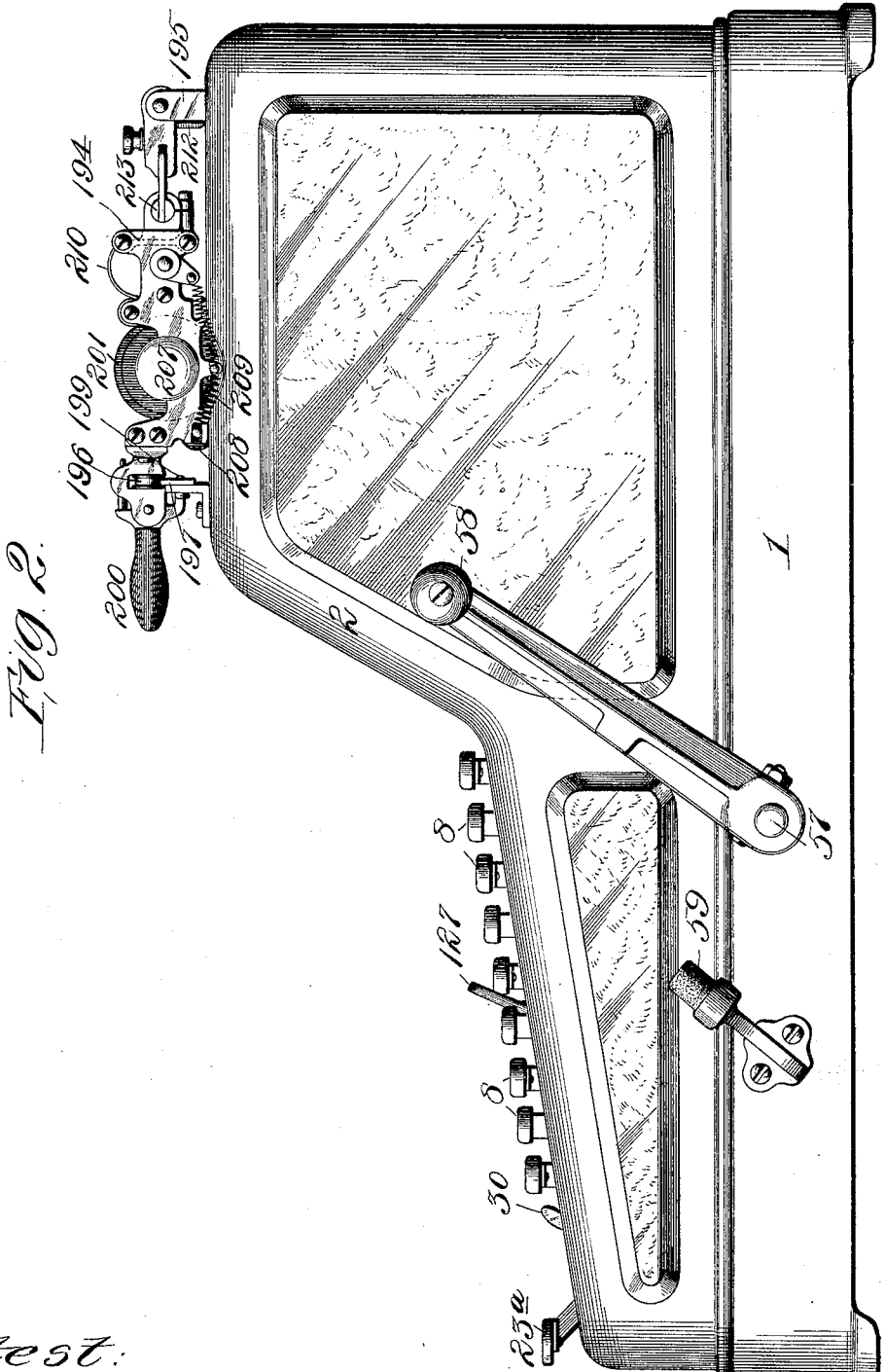
Figure 3:
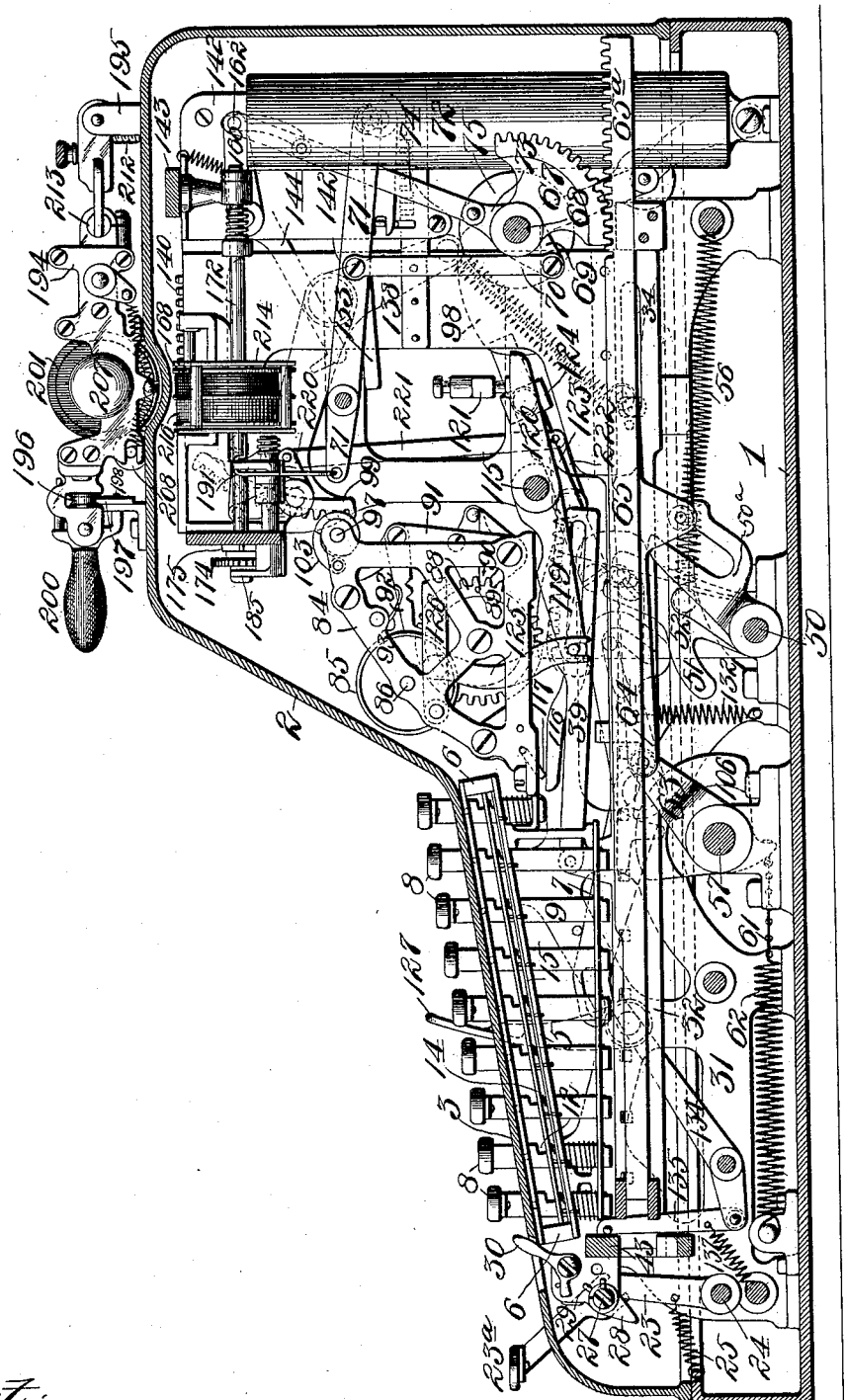
Figure 4:
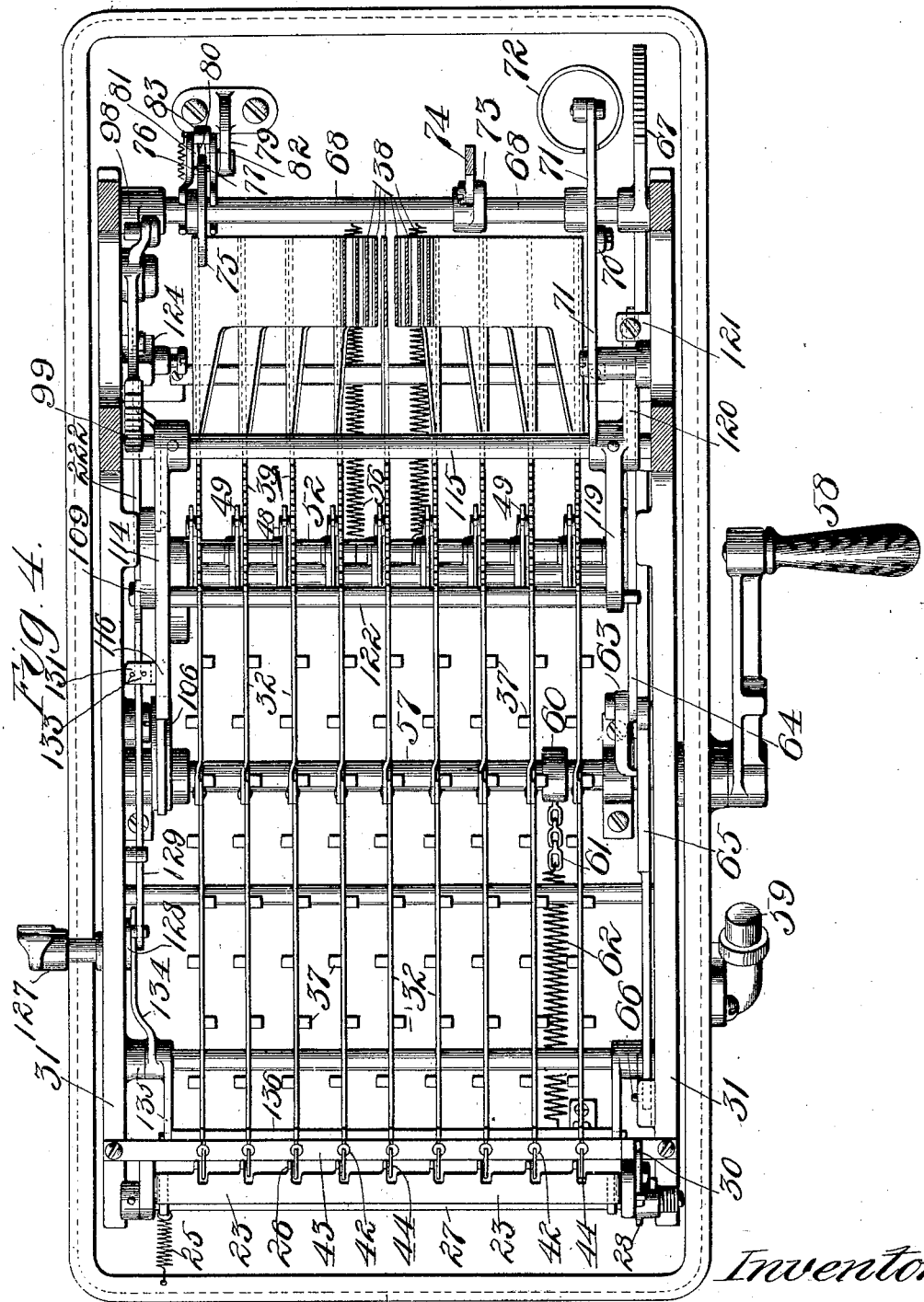
Figure 5:
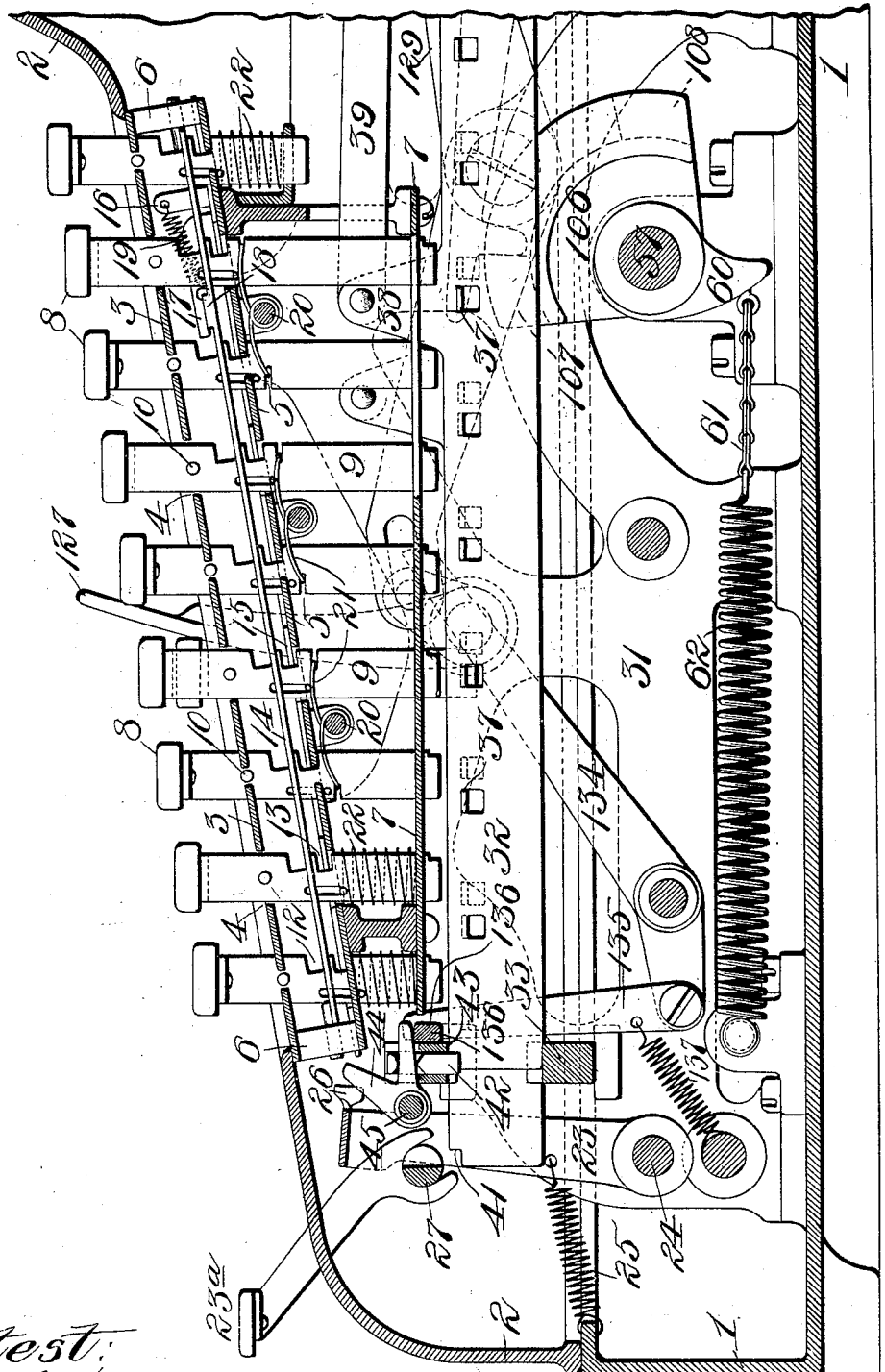

Figure 1 is a top plan view of my improved calculating-machine. Fig. 2 is a side elevational view. Fig. 3 is a side elevational view of the interior mechanism, the inner side wall of the casing and the inner framing of the machine being removed. Fig. 4 is a horizontal sectional view taken on a plane below the keyboard, adding-wheels, and printing mechanism, the casing being omitted. Fig. 5 is a vertical longitudinal sectional view, full size, of the front end of the machine, comprehending the keyboard and associate mechanism. Fig. 6 is a vertical horizontal sectional view showing the middle portion of the machine and comprehending the adding-wheels and their associate mechanism. Fig. 7 is a vertical longitudinal sectional view through the rear end of the machine and comprehending the printing devices and their associate mechanism. In the last-named figure the casing is omitted. Fig. 8 is a view on the same lines as Fig. 7, showing the parts in a changed position. Fig. 9 is a side elevational view of the printing devices and their associate mechanisms. Fig. 10 is a side elevational view of the frame and its associate parts, in which frame are pivoted type-hammers, &c. This last-named view illustrates the mechanism as seen from the opposite side. Fig. 11 is a vertical cross-sectional view on line 11 11, Fig. 9, said view showing the frame in elevation. Fig. 12 is a horizontal sectional view on line 12 12, Fig. 11, the frame being omitted. Fig. 13 is a rear elevational view of the upper portion of the rear end of the machine. Fig. 14 is a detail view of the mechanism employed for engaging and disengaging the racks from the adding-wheels. Fig. 15 is a side elevational view of one of the side members of the frame for lifting the racks into engagement with the adding-wheels. Fig. 16 is a detail view, as seen from the inside of the machine, of the mechanism for operating the friction-shaft from the main driving-shaft. Fig. 17 is a view similar to Fig. 14, showing the parts in a changed position. Fig. 18 is a top plan view of the device shown in Fig. 17. Fig. 19 is a front elevational view of the forward end of the machine. Fig. 20 is a top plan view of a portion of the construction shown in Fig. 19. Fig. 21 is a sectional view on line 21 21, Fig. 19. Fig. 22 is a cross-sectional view on line 22 22, Fig. 6. Fig. 23 is a top plan view of the accumulator, showing the adding-wheels and their associate parts. Fig. 24 is a rear elevational view of the adding-wheels and their associate parts. Fig. 25 is a sectional view on line 25 25, Fig. 23. Fig. 26 is a sectional view on line 26 26, Fig. 23. Fig. 27 is a horizontal sectional view through the keyboard. Fig. 28 is a sectional view on line 28 28, Fig. 27. Fig. 29 is a sectional view on line 29 29, Fig. 27. Fig. 30 is a sectional view on line 30 30, Fig. 27. Fig. 31 is a top plan view of the printing devices, the inking-ribbon, and feeding mechanism for feeding the ribbon. Fig. 32 is a front elevational view of the ribbon-feed. Fig. 33 is a similar view showing the feeding mechanism in a changed position. Fig. 34 is a longitudinal sectional view through the platen and its carriage, said parts constituting the paper-feed mechanism. Fig. 35 is a side elevational view of the same. Fig. 36 is a side elevational view, partly in section, of the ribbon-shifting mechanism. Fig. 37 is a side elevational view of the mechanism for shifting the ribbons. Fig. 38 is a top plan view showing the twin spools and part of the shifting mechanism.

This invention relates to a new and useful improvement in calculating-machines, one object being to make a machine of the character described absolutely positive in its movements, compact, cheap, and simple in operation and one which is easily operated.

Another object is to so arrange the paper-feeding mechanism that parallel columns of figures will be printed thereon.

The features of my present invention reside chiefly in the novel construction and arrangement of the keyboard, the novel construction and arrangement of the printing mechanism, the novel construction and arrangement of the paper-feeding mechanism, whereby parallel columns may be printed on a single sheet of paper, and in the novel construction, arrangement, and combination of the various parts, all as will hereinafter be described and afterward pointed out in the claims.

In the accompanying drawings I have shown a machine adapted to the decimal system; but it is obvious that by slight changes in several of its parts said machine could readily be adapted to other systems—as, for instance, that in vogue with respect to English money. I will also state that with the exception of Figs. 1 to 4 the drawings show the parts in full size and that the machine shown in the accompanying drawings is in actual operation.

Before entering into a detailed description of the several parts of my improved calculating-machine I will briefly describe the general characteristics thereof. There is a keyboard at the front of the machine comprising longitudinal series of depressible keys, said keys bearing numbers from "1" to "9," inclusive, the keys of the several series bearing similar numbers being preferably arranged in banks. In other words, transverse series bear numerals of the same denomination, while the longitudinal series bear numerals from "1" to "9," inclusive. The longitudinal series of keys, nine in number, which will hereinafter be designated as "series of keys," set up, with the exception of the "9" key, stops in different positions relative to a sliding bar, which bar is provided with lateral projections designed, when the bar is actuated, to come in contact with the depressed key-stop and be arrested in its movement. The shanks of all the keys, with the exception of the "9" key, are provided with two notches and a lateral pin. A spring-pressed wing is in the path of these pins, so that when a key is depressed this wing releases a sliding plate which engages the uppermost notch of the depressed key, holding it in its depressed position, the lowermost notches of the elevated keys in that series preventing the latter from being depressed. This locking-plate when tripped raises a catch to release the horizontally-movable bar before referred to, which bar carries a pivoted rack. A handle is arranged at the side of the machine, and when this handle is pulled forward the bar, with its pivoted rack, is moved forward by friction until one of the lateral projections on the bar strikes the lower end of the depressed key and is arrested, the frictional device continuing its movement to the full forward limit, depending upon the continuation of movement of the operating-handle. The sliding bar will thus be arrested in one of nine positions, depending upon the position of the depressed key. As the handle approaches its forward limit of movement devices are operated to throw the pivoted rack into engagement with a gear-wheel of the accumulator, such engagement continuing while the handle is moved rearwardly and approaches the end of its rear stroke, which rearward movement of the handle restores the horizontal sliding bar and its pivoted rack through the friction devices before referred to and in so doing rotates the engaged gear-wheel of the accumulator a distance proportionate to the position of the sliding bar from its normal to its arrested position.

The "accumulator," as I have termed it, is a device consisting of a series of number-bearing disks for exhibiting the sum total of the numbers added in the machine, which disks are rotated by gear-wheels thrown into and out of mesh with the pivoted racks before referred to. These gear-wheels of the accumulator carry pins, in whose paths are arranged "pawls" or "dogs," as they are called, which latter are designed to be tripped and moved rearwardly the distance of one tooth on the next gear-wheel in advance. A rotary shaft is positively driven when the operating-handle is pulled forward (said shaft remaining idle during the return movement of the handle) and, through the engagement of a series of spirally-arranged pins on said shaft, resets the transferring-dogs when they are tripped and in so doing actuates a wheel in the next higher order, as is well understood.

Each of the sliding bars before referred to carries at its rear end a frame in which are loosely mounted a series of movable type, one of which, the "0" type, is normally in the printing-line. When one of the bars is moved forward, this type-frame is carried therewith and presents the type to the printing-line corresponding to the numeral on the depressed key, whose shank serves as a stop to determine the limit of the forward movement of said bar. Separately-operable type-hammers are designed to deliver blows to the movable type to effect an impression, and these type-hammers are controlled by two pawls, one of which is actuated when the type-frame moves forward and the other by the handle, so that when an example is set up on the keyboard no type-hammer to the left of the highest order will be actuated; but all hammers to the right, or those making impressions of the lower orders, will be actuated, so that any number of lower order will make the proper record in addition to having the "0" type print wherever required.

Over the printing-line of type is arranged an inking-ribbon designed to be driven by the type against a sheet or strip of paper backed by a suitable platen, and after each type impression this ribbon is wound upon one of two spools, and automatic mechanism is provided for changing the direction of movement of said ribbon, which automatic reversing mechanism depends upon one of the spools upon which the ribbon is wound being exhausted, and the tension of the ribbon is relied upon to actuate the reversing mechanism. There is also a paper-carriage on top of the machine, having a long platen in the form of a roller adapted to receive a wide sheet of paper. This carriage is designed to be adjusted to several positions in order that parallel columns of figures may be printed on the same sheet of paper. Mechanism is also provided for printing a total and either keeping the total in the accumulator and adding other sums thereto or clearing the machine and returning the accumulator to "0" after the total is taken. Means are also provided for clearing the keyboard in the event that an example has been set up thereon and a mistake made.

In the following description I will endeavor to describe the details of construction of the several parts of my machine, arranging the same under appropriate headings and observing in such arrangement the general plan as outlined in the brief description above.

*The casing.*—1 indicates the base of the casing, which, as shown in Figs. 2 and 3, is a trough-like structure, preferably supported by suitable legs having rubber feet, if desired, the bottom wall of which casing is preferably imperforate and the side walls thereof having inturned flanges at their upper edges. The frame proper of the machine is bolted or otherwise secured to this casing and is inclosed by a removable cover 2, fitting snugly on the base-casting. This cover is provided with an opening in its forward upper face, through which access may be had to the keys of the keyboard, and small openings are provided for the passage of several levers and for the type in the printing-line. The casing, comprising the base-casting 1 and its removable cover 2, serves to exclude dust and foreign particles from the moving parts of the machine and also prevents accidents thereto from external sources. Wherever openings are provided in the casing for the projection of moving parts from the interior thereof, the openings are made as small as possible for well-understood purposes.

*The keyboard.*—The construction of the keyboard is best seen in Figs. 27 to 30.

3 indicates what I will term the "top" plate of the keyboard, which plate is formed with T-shaped openings 4 for the passage of the shanks of the several keys, said openings being preferably staggered in longitudinal series.

5 indicates the bottom plate of the keyboard, which is also formed with openings for the passage of the shanks of the keys, said top and bottom plates being spaced apart by bars 6, said bars 6 guiding the sliding plates, hereinafter described, in their movement.

7 indicates guide-strips arranged a suitable distance beneath the plate 5, through openings in which strips the lower ends of the keys pass and are guided.

8 indicates the heads of the keys, on whose upper faces are indicated numbers running from "1" to "9," inclusive, in each series of keys.

9 indicates the key-shanks, which carry laterally-projecting pins 10 and have notches 12 and 13 cut in their side edges, as shown in Fig. 30.

14 indicates wings pivoted in the spacing-bars 6, there being a wing for each series of keys, with which wing all of the lateral pins 10 of such series of keys coöperate.

15 indicates a sliding plate notched in its side edges to coöperate with the key-shanks of a series. Plate 15 carries a post 16 and a vertically-arranged catch projection 17, formed with shoulders, with which coöperates a lateral projection 18, extending from the wing 14. A spring 19 is connected to the post 16 and the projection 18 of the wing and serves the double purpose of tending to hold the wing 14 in an elevated position at all times and also to exert a constant pressure tending to move the locking-plate 15 in a forward direction.

The operation of the keyboard as above described is as follows: When one of a series of keys is depressed, the pin 10 comes in contact with and depresses the wing 14 common to the series in which is located the operated key. The depression of this wing causes its projection 18 to move downwardly out of the path of the catch 17 and permit the spring 19 to pull the locking-plate 15 in a forward direction, so that the shoulder on said plate in line with the depressed key will fall into the recess 12, the remaining shoulders of said plate in line with the recess 13 of the remaining keys of that series being received by said recesses to lock the remaining keys in an elevated position. This construction results in locking the depressed key in its lower position and the remaining keys of that series in an elevated position, so that no other key of that series can be depressed until the key originally depressed has been restored to its elevated position, which restoration depends upon the retraction of the sliding locking-plate 15. Suitable rods 20 are mounted beneath the plate 5, on which rods are arranged torsion-springs 21, one spring being common to two keys of a series, and said springs serving to restore the keys to their elevated positions when the locking-plate 15 is moved rearwardly and a depressed key released. Elliptically-shaped spiral springs 22 may be employed to elevate the first two keys bearing the numbers "1" and "2" and the key bearing the number "9" where it is inconvenient to use the torsional springs 21. Should the wrong key be depressed by an operator, the keyboard may be cleared and all of the keys thereof restored to their elevated positions ready for another operation by means of a frame 23, pivotally mounted on a rod 24, which frame is normally held in a forward position by a spring 25. (See Fig. 5.) The upper cross-bar of this frame is provided with vertically-disposed projections 26 in line with the several locking-plates 15, and means are provided for operating this frame from the exterior, so that these vertically-disposed projections will contact with and restore the actuated plates 15. This means is shown more clearly in Fig. 5, and consists of a handle 23ª, mounted on a rod 27, designed, when it is rocked, to move the frame 23 rearwardly. There are mechanical means for restoring the locking-plates and releasing the keys; but the mechanism above described is for accomplishing the manual restoration. 28 indicates a tappet mounted upon the outer end of this rod, said tappet having a pin 29 projecting upwardly from its hub portion, with which a manually-operable bell-crank lever 30 coöperates. The upper end of this lever projects through an opening in the casing 2, and when it is desired to prevent the mechanical restoration of the locking-slides 15 all that is necessary is to move the projecting end of this lever 30 forwardly, which will turn the tappet 28 out of the path of its actuating means, permitting the machine to repeat the operation of adding the number set up on the keyboard in the accumulator as many times as desired or as many times as the handle is operated. In concluding the description of the details of this keyboard I will say that the frame, comprising the plates 3 and 5 and the guide-strips 7, with their carried keys and key-springs, forms a removable part as an entirety and is attached to the main frame of the machine by suitable securing-screws passing through the plate 5 and into said main frame. The keyboard can thus be made separately and applied to a machine as a complete and finished entity.

*The frame.*—The frame of the machine consists of two castings 31, which are lightened by providing spaces or leaving out metal at appropriate places, said frame also affording bearings for the several cross-shafts, which will hereinafter be described. Cross bars or rods are employed at convenient points for tying the side frame-castings together, and this framing as an entirety is bolted or otherwise secured to the base-casting 1.

*The sliding bars.*—The separately-movable keys forming the different series heretofore described set up, with the exception of the "9" key, separate stops for arresting a sliding bar common to each series of keys. These sliding bars, which I have numbered 32 in the drawings, have their forward ends supported in grooves in a cross-bar 33, (see Fig. 19,) while their rear ends are formed with slots 34, through which passes a cross-bar 35. (See Fig. 7.) The keys constituting a series, to which series of keys one of these sliding bars is common, are spaced so as to set up stops at equal distances apart, and the sliding bar is provided with equidistant stops 37, preferably formed by striking up the metal of which the bar is composed, alternate stops 37 projecting from opposite sides of the bar. The distance between the stops 37 is greater than the distance between any two keys of a series, and, as before stated, the keys of a series are staggered, which staggered arrangement adapts alternate keys to coöperate with projections 37, extending from opposite sides of the bar 32. To illustrate the purpose of this arrangement, we will refer to Fig. 5, wherein it will be seen that key marked "1" coöperates with the first stop 37, (the one nearest the forward end of bar 32,) said stop projecting from the far or opposite side of the bar 32. Key marked "2" coöperates with the second stop 37, (from the forward end of bar 32,) said stop projecting from the near side of bar 32, this stop with which this key coöperates permitting the bar to move twice the distance before the stop engages with the key than does the first-mentioned stop when the bar is moved for said stop to coöperate with the key marked "1." Key 3 coöperates with the third stop projecting from the far side of bar 32, and the bar has to move three times the distance before this stop coöperates with key 3 than it does when the first stop coöperates with key 1, &c. Key 9 does not set up a stop for the bar 32, because when this key is depressed the bar is actuated the full limit of its movement, which is determined by the length of the slot 34.

38 indicates a projection extending upwardly from the bar 32, to which projection is pivoted a rack 39, (see Fig. 6,) said rack being provided with ten teeth and adapted to coöperate with the gear-wheel of the adding mechanism. The rear end of this rack is slotted, as at 40, for purposes to be hereinafter described.

Each bar 32 is provided with a shoulder 41 at its forward end, with which coöperates a locking-pin 42, (see Figs. 5 and 19,) there being a pin for each bar, and these pins are mounted in vertical openings in a cross-bar 43, secured to the side frames of the machine. Bar 43 is preferably grooved transversely the openings in which are located said pins 42 for receiving one member of a bell-crank lever 44, which member might properly be termed a "finger," said finger passing through an opening or slot in the upper end of the pin. A transversely-arranged bar 45 affords a bearing for these bell-crank levers 44, and torsion-springs 46 coöperate with said bell-crank levers to hold them in such a position that the fingers which pass through the pin 42 are normally held in a lower position, so that said pin will occupy a position in front of the shoulder 41 on the slide-bar 32 and prevent said slide-bar from being moved forward unless the bell-crank lever is rocked on its shaft. To rock the bell-crank lever, the vertically-extending member thereof is in the path of one of the sliding plates 15, which sliding plate when released by one of a series of keys contacts with said bell-crank lever and elevates the pin 42 out of the path of the shoulder on the slide-bar 32. This pin is held in its elevated position as long as the locking-plate 15 engages the bell-crank lever; but as soon as the locking-plate is returned to release the keys and permit their restoration the bell-crank lever is likewise released and the spring-pressed pin 42 is in readiness to fall in front of the shoulder on the bar 32, with which it coöperates.

I will state that the several bell-crank levers 44 are arranged in juxtaposition to the vertical projections 26 on the rocking frame 23, and when any of the locking-plates 15 are released to lock the keys said plates are arrested in their forward movement by the vertical projections 26, and thus the movement of the bell-crank levers 44 is limited. The torsion-springs for returning the bell-crank levers of course are comparatively weak, the springs 19, moving the locking-plates, being the master-springs in this operation and overcoming the torsion-springs of the bell-crank lever.

*Frictional drivers.*—Each of the bars 32 has a pin 48 near its rear end, (see Figs. 6 and 22,) which pin extends laterally and is received by a slot (preferably an open-ended slot) in the upper end of a rock-arm 49, suitable antifriction-washers being arranged on the pin 48 and on each side of the arm 49. This arm 49 is pivotally mounted on a shaft 50, journaled in the side frames, and is preferably made of thin metal loosely strung on said shaft, the forward edge of said arm being extended or formed with a track 51. Shaft 50 has a series of arms 52 pinned thereon, the hubs of which arms serve as spacing-washers for the arms 49, while the outer ends of arms 52 are bored transversely for receiving frictional devices, preferably in the form of balls 53, there being two balls in the bore of each arm, with a spring 54 interposed therebetween, which spring exerts a constant pressure against said balls and holds them against the adjacent arms 49. (See Fig. 22.)

In the normal position of the parts—that is, a position in which the bars 32 are retracted and the fixed arms 52 are rearmost—the balls 53 coöperate with openings 55 in the arms 49 in alinement therewith, so that in such normal position the balls are designed to be seated in such openings. Should the arms 52 be rocked forward, the balls being seated in the openings would exert considerable pressure to move said arms 49 and their connected slide-bars 32 in a forward direction, and if bars 32 are not locked by the pins 42 the bars will be moved forward. However, if bars 32 or any of them are locked the balls in the arms 52 will ride out of the openings 55, the bars remaining stationary. This action also occurs when any of the bars 32 are moved forward by the arms 52 and are arrested by one of the key-stops before completing their movement, in which event the balls will ride out of the openings in the arm or arms 49, as before described. It will be obvious that the track extension 51 affords a bearing for the balls in all positions of the arms 52, whether or not the bars 32 are moved to a slight extent or remain stationary. It will also be understood that should the bars 32 be moved forward but a portion of the movement of which they are capable the arms 52 complete their movement and in returning tend to restore the arms 32 by frictional contact of their balls, which if not sufficient to overcome the resistance met with by the bars 32 will cause said balls to ride over the track extension in their rearward movement until they reach the openings 55, when they will immediately drop therein and increase friction between the arms 52 and the arms 49 to such an extent as to overcome all the resistance encountered by the arm 32 in its rotation of the adding-wheel.

56 indicates springs, of which there are preferably two, having their forward ends connected to the arms 52, while their rear ends are attached to some stationary support. The function of these springs is to return the arms 52 to their normal or rearward position.

*The operating-handle.*—57 indicates a transversely-arranged shaft journaled in suitable bearings, preferably bolted to the base casting 1. This shaft has an operating-handle 58 mounted on one of its ends, which protrudes through the base casting 1 and preferably at the right-hand side of the machine, though it is obvious that this handle 58 could be as conveniently arranged at the left-hand side of the machine, if so desired.

As shown in Figs. 1 and 2, a buffer 59, preferably made of rubber, is arranged in front of the handle 58 for the purpose of limiting and cushioning the forward stroke of the handle.

60 indicates a cam the outer end of which is attached to a flexible connection 61 from a spring 62, whose function is to return the operating-handle to its normal or rearward position. This operating-handle operates the movable parts of the machine through the instrumentality of a rock-arm 63 and a slotted (or grooved) quadrant, the latter to be hereinafter described. Arm 63 connects by a link 64 to a longitudinally-movable rod 65, (see Fig. 16,) which rod, as shown in Fig. 4, is mounted in suitable guideways projecting from the inner face of one of the side frames of the machine. This rod 65 carries a pin 66 at its forward end, which coöperates with the tappet 28, mounted on the outer end of the cam-rod 27, heretofore described, and in the forward movement of said rod the tappet is raised, rotating idly on the outer end of cam-shaft 27, by reason of cam-slot and pin connection with said shaft, (see Figs. 20 and 21,) a torsional spring returning the tappet to its original position behind the pin 66. When the handle starts on its rearward movement, rod 65 is likewise moved rearwardly, and pin 66, engaging the tappet 28, (unless the tappet is raised by the repeating-lever,) rocks the cam-shaft 27, so as to vibrate the frame 23 and restore all of the locking-plates 15, which are in a forward position, in order to release the keys to enable them to return to their elevated position. The spring 25 pulls the frame 23 forward, and this action restores the tappet 28 to its original position, when said tappet is released by the pin 66. The dotted lines in Fig. 21 show the extreme forward position of the rod 65 and illustrate the fact that after the tappet 28 has been idly vibrated the rod moves rearwardly some distance before it engages with said tappet to restore the locking-plates 15, as before described. Link 64 is provided with a roller $64^a$, (see Fig. 16,) which coöperates with an arm $50^a$, fixed on shaft 50, to positively rock said shaft in one direction, the spring 56 returning said shaft and its friction devices. Arm $50^a$ is preferably bifurcated, as shown, one member thereof, the rear, (see Fig. 3,) being shorter than the other or forward member. The object of this is to permit the roller or link 64 to occupy a normal position slightly to the rear of the long member of this slotted arm $50^a$. Thus when the handle is moved forward there is a slight lost motion before the roller contacts with the long arm to rock the shaft 50, the continued movement of the handle operating the friction devices to move the slide-bars forward. When the handle is in its forward position, the roller on link 64 is practically at the bottom of the slot in arm $50^a$, and the return movement of the handle positively rocks the shaft 50 through the arm $50^a$ until the handle has nearly reached the extremity of its rearward movement. After the shaft 50 is at rest the movement of the handle beyond such point is occupied in disengaging the pivoted racks from the adding-wheels, as will hereinafter be described. Thus it will be seen that the pivoted racks are positively held into engagement with the adding-wheels during the entire movement of the friction devices which restore the slide-bars and their pivoted racks to their home positions, and that after said slide-bars and friction devices are at home and at rest the final movement of the handle effects the disengagement of the pivoted racks from the adding-wheels.

The rear end of rod 65 is provided with a rack $65^a$, (see Fig. 3,) with which meshes a segment 67, fixed to a cross-shaft 68, mounted in the side frames of the machine. This cross-shaft 68 carries a rock-arm 69, connected by a link 70 to a lever 71, said lever being attached at its rear end to a plunger in a dash-pot 72, pivotally mounted on the base casting 1, so as to oscillate and accommodate itself to the arc of movement of said lever 71, said dash-pot being employed for the well-known purpose of a cushion, as well as regulating the stroke of the lever. This dash-pot is preferably filled with liquid (lubricant) and a valved by-pass provided, as is well understood. Shaft 68 also carries a rock-arm 73, to which is connected a link 74, extending to the printing mechanism, which will hereinafter be described.

In order to prevent a return movement of the handle when a partial stroke is made, I provide a disk or segment 75 on shaft 68, (see Figs. 7 and 13,) which disk carries oppositely-projecting pins 76 and 77 near its periphery, while the periphery is notched, as at 78, between said pins. A frame 79 affords a bearing for a pivoted dog 80, in the form of a double pawl, which is designed to coöperate with the notches in the disk 75. This double pawl has two tappets 81 and 82 projecting from its body portion and extending up on each side of the disk 75, where they coöperate with the pins 77 and 76, respectively. An auxiliary detent or pawl 83 is pivoted to the frame 79 and yieldingly held against one end of the double pawl 80, where it coöperates with a notch and a projection on the pawl 80 for holding said pawl, so that one or the other of its ends will contact with the periphery of the disk 75, and engage the notch thereof. The operation of this construction is as follows: Assuming the parts to be in the position shown in Fig. 7, the movement of the disk in the direction of its arrow will cause the inner pawl to engage the first notch 78 and prevent a return movement of the handle and then the second notch 78. A continued movement of the disk in the same direction will cause the pin 76 to strike the tappet 82 and throw the pawl to the position shown in Fig. 8, wherein it will be seen that the rear end of the pawl now rests against the periphery of the disk and the auxiliary pawl 83 has left its notch and is bearing upon the projection extending rearwardly from the double pawl and forcing the same against the periphery of the disk. The handle is now at its extreme forward position, and upon moving rearwardly the disk will be rotated in the direction of the arrow shown in Fig. 8, when the rear end of the pawl will coöperate with the notches 78 to prevent the handle from moving forward when the pawl falls in either of said notches, the final movement of the disk causing the pin 77 to strike the tappet 81 and again reverse the position of the double pawl, the auxiliary pawl falling into the notch and holding the double pawl in this new position ready for another operation.

*The accumulator.*—As shown in Figs. 3 and 6, that part of my improved calculating-machine which I have designated the "accumulator" is arranged in a separate frame 84, bolted or otherwise secured to the main side frames of the machine. This frame 84 affords bearings for the several shafts on which the gear-wheels, &c., of the adding mechanism or accumulator are mounted. I use the word "accumulator" in the sense that when an example is set up on the keyboard and the handle operated the indicating-disks bearing appropriate numbers will be rotated to indicate the number or example set up on the keyboard and hold the same in the machine. When another example is set up on the keyboard and the handle operated, this new sum will be added to the one first introduced into the machine, and the indicator will show the total of the two sums or will accumulate the sums as they are introduced into the machine, so that the proper total will be exhibited to the operator. This accumulator also involves mechanism, which will now be described, for transferring from an indicating-wheel of a certain order to the next indicating-wheel of the next higher order.

The indicating-disks to which I have referred are marked 85 in the drawings and carry on their peripheries the figures "0," "1," "2," "3," "4," "5," "6," "7," "8," "9," ten in all. These indicating-disks are loosely mounted on a shaft 86, and each has conjoined thereto a pinion 87, having ten teeth, in mesh with a gear 88, having any number of teeth which is a multiple of ten. In the drawings the gears 88 have thirty teeth. At distances of ten teeth apart gears 88 carry laterally-projecting pins 89, whose function is to coöperate with an inwardly-extending projection 90 on a rocking frame 91, which frame has a detent or pawl 92 pivoted near its upper end and in engagement with the gear 88 of the next higher order. Gears 88 are loosely arranged on a suitable shaft in order that they may be rotated independently of each other, and each gear is provided with pins 89 to coöperate with projections extending inwardly from independently-movable frames 91, before described, and each of these frames carries a pawl 92 in engagement with the gear 88 of the next or higher order, with the exception of the frame 91, which coöperates with the gear 88 of the highest order in the machine. Suitable springs 93 bear upon the pawls 92 to hold them in engagement with their respective gears. If desired, torsional springs 94 may also be employed to assist the springs 93 in this action. The upper end of each of the frames 91, with the exception of the one coöperating with the gear-wheel of the highest order, is formed with a lateral projection 95, which when the frame is in its normal or forward position is out of the path of a revolving pin 96, carried by a shaft 97. There is one pin for each frame, and the pins are preferably arranged spirally around the shaft, so that should the tripping of one of the frames 91 by one of the gear-wheels of lower order cause the next wheel of higher order when actuated by the shaft 97 to trip its frame, and so on, the gears 88 will be operated successively. For instance, if the indicating-disks exhibit "199" and one is added thereto the gear-wheel of lowest order will, in exhibiting "0" by the addition of one, trip its frame 91, this on the rearward movement of the handle. When the handle is again moved forward, the shaft 97 is rotated, and in so doing the pins at the extreme right end of the shaft will first coöperate with the frame 91, which was actuated by the gear-wheel of the lowest order, and in restoring said frame 91 actuate the gear-wheel 88 of the next higher order, which had heretofore exhibited "9," so that this second gear-wheel will exhibit "0" and in so doing trip its frame 91, causing the lateral projection 95 on the upper end thereof to get in the path of the next pin 96, circumferentially displaced or spirally arranged, and, as before stated, so that the second frame 91 will be restored by the second pin and in so doing actuate the third gear-wheel 88 or the one of next higher order, which we may term the "hundreds-wheel," so that when the handle completes its forward movement the indicating-disks will show the proper number—to wit, "200." It will be seen in this connection that two motions of the handle are necessary to have the indicating-disks display the sum total of the numbers added in the machine, the forward movement of the handle completing the operation which was left incomplete by the rearward movement of the handle in the preceding stroke.

The above will be more clearly developed hereinafter; but I will anticipate this by stating briefly that the forward movement of the handle moves the slide-bars 32 until they are arrested by the stops set up by the keys, and the rearward movement of the handle causes the racks carried by the slide-bars to engage the gears 88, and in restoring the slide-bars 32 the gears 88 are rotated a distance corresponding to the forward movement of the slide-bars to the point where they were arrested by the key-stops.

The example set up on the keyboard is "placed," if we may use that term, in the gear-wheels 88 on the backward movement of the handle; but the members are not transferred from a lower to a higher order in these gear-wheels until the handle is again moved forward.

To accomplish the rotation of shaft 97 when the handle moves forward and permit said shaft to remain idle upon the rearward movement of the handle, I arrange a cam 98 on the shaft 68, with which coöperates a roller on the depending member of a segment 99, suitably pivoted to the side frame of the machine, (see Figs. 7 and 8,) which segment meshes with a pinion 100, loosely mounted on the end of shaft 97. The outer end of cam 98 is preferably made concentric to its axis of rotation, so that its final movement when the handle is moving forward will not affect the position of the segment 99. Thus the shaft 97 is brought to a position of rest before the handle reaches the limit of its forward movement. It is necessary to operate all of the transferring devices when the adding-wheels are free to rotate and before the pivoted racks are thrown into engagement therewith, which latter is done at about the time the handle reaches the limit of its forward movement. In other words, the transferring mechanism has completed its work while the adding-wheels are free, and when the adding-wheels are thrown into mesh with the pivoted racks and so locked by the pivoted racks the operating-cam for the segment accomplishes nothing more than an idle movement. Pinion 100 has a frame for carrying a pawl 101, coöperating with a one-tooth ratchet 102, fixed to the shaft 97. A pawl 103 coöperates with a ratchet 104 at the opposite end of the shaft (see Fig. 25) for preventing the shaft from rotating backward. Of course it will be understood that ratchets having more than one tooth can be employed; but I prefer a one-tooth ratchet, for the reason that the noise of the pawl falling behind a single tooth is comparatively slight. When the handle moves forward, the segment 99 is forced downward by the cam 98 and rotates the pinion 100, so that its conjoined pawl 101 positively drives the shaft 97 in the direction indicated by the arrow in Fig. 6. One complete rotation is given to shaft 97 when the pawl 103 drops behind the tooth of ratchet 104. The handle has now reached the forward limit of its stroke, and on its return movement the segment 99 moves upwardly and the pinion 100 rotates in an opposite direction. However, the shaft 97 is prevented from rotating backwardly by the pawl 103. In the backward rotation of the pinion 100 its conjoined pawl 101 rides over the face of the ratchet 102, and just before the handle reaches the limit of its rearward stroke the pawl 101 drops behind the tooth of the ratchet ready to positively rotate the shaft 97 upon the next forward movement of the handle.

In order to prevent momentum from carrying shaft 97 beyond its designed position, a friction-clip 105 (see Fig. 26) is arranged on the pawl-carrying frame conjoined to the pinion 100, the free members of said clip being sprung over the shaft 97, which they embrace tightly and offer resistance to the independent rotation of said shaft. Thus when the handle completes its forward movement and rotates the shaft 97 positively the cessation of movement of the handle and the consequent stoppage of segment 99 and pinion 100 would, were no means provided to prevent it, cause the shaft 97 to continue to rotate by momentum. However, the spring-clip 105 serves as a brake for the shaft and would, were it not for the opposition of pawl 103, cause the shaft to rotate backwardly.

I will now describe the mechanism employed for automatically throwing the pivoted racks 39 and the slide-bars 32 into and out of engagement with the gears 88 of the accumulator. Mounted on the shaft 57, which carries the handle, is a quadrant 106, having a groove or slot in its periphery, whose end walls are formed by blocks or stops 107 and 108. (See Figs. 5 and 14.) An arm 109 is mounted on a shaft 50, which carries the friction device for moving the slide-bars 32. Arm 109 is provided with a ball race or track similar to the arms 49.

110 indicates a link pivotally mounted on the arm 109 and provided at its free end with a projection 111, which is received in the slot or groove in the periphery of the quadrant 106.

112 indicates a cam groove or slot in the upper end of arm 109, in which slot is received a pin or roller 113, secured to the side bar 114 of a rocking frame which is pivotally mounted on a transverse rod 115, journaled in the side frames of the machine. This side bar 114 has a forwardly-projecting finger 116, upon which rests a pivoted wing 117, said wing coöperating with the tailpiece of spring-pressed locking-dogs 118, which coöperate with the teeth of gears 88. When the finger 116 is elevated to throw the racks 39 into engagement with the gears 88, it causes the wing 117 to elevate the tail ends of the spring-pressed locking-dogs 118, and so withdraw the dogs from engagement with the gears 88. Thus the gears 88 are locked against movement by these dogs at all times except when the gears are in mesh with the pivoted racks 39, which racks only permit the gears to be rotated proportionately to the movements of said racks. The dogs also permit the pawls 93 on the pivoted frames 91 to rotate the gears 88 the distance of one tooth, as hereinbefore described.

In Fig. 15 it will be seen that the side bar 119 serves as a companion to the side bar 114. The side bar 119, however, is provided with a rearwardly-extending finger 120, which coöperates with a rubber buffer 121, secured to the side frame of the machine, for well-known purposes. The forward ends of bars 114 and 119 carry a rod 122, which rod is preferably flattened on two sides, so that its thickness will be less than the width of the slot 40 in the pivoted rack, said flattened bar being turned or otherwise provided with grooves for receiving the walls of the slot in the pivoted racks when said bar is arranged in substantially a vertical position, as shown in Fig. 6. This construction is desirable in that the grooves in the bar 122 properly guide the pivoted racks in their movement and space them the proper distance apart. In operation upon the forward movement of the handle, the quadrant 106 is moved in the direction of the arrow in Fig. 14, and the projection 111 on the arm 110 rides in the slot or groove in the periphery of the quadrant until engaged by the block or stop 108, whereupon the arm 109 is moved in a forward direction, and in so doing elevates the bar 122 through the medium of the cam-slot 112. The elevation of the bar 122 carries all the pivoted racks 39 with it and into engagement with all of the gears 88. It will be borne in mind that the first or initial movement of the handle in a forward direction moves all of the released slide-bars 32 to positions where they are arrested by the key-stops, or to the full limit of their movement if the 9 key is depressed, and during this initial movement the quadrant 106 is also moving, but by reason of the space between the projection 111 and the block 108 does not move the arm 109 until the handle has moved the slide bars forward to their respective limits. The final movement of the handle moves the arm 109 and throws the pivoted racks on the slide-bars 32 into mesh with the gears 88 and also raises the dogs 118 out of engagement with the gears. The rearward movement of the handle restores the slide-bars 32 to their normal position, and this restoration causes the racks carried by said slide-bars to rotate the gear-wheels 88, with which they are in mesh. Of course the quadrant returns to its normal position upon the rearward movement of the handle; but by reason of the space between the projectiles 111 and the forward block 107 the arm 109 remains stationary and the racks are held in engagement with the gears 88 until the block 107 contacts with the projection 111 and forces the arm 109 rearwardly and disengages the racks from the gears 88, coincidently reëngaging the dogs 118 with said gears. This takes place at or near the extremity of the rearward movement of the handle. In order that the arm 109 be not accidentally displaced, I prefer to run an extension 123 therefrom, which coöperates with a friction device 124 on the frame. (See Fig 4.)

125 indicates a link (see Figs. 15 and 22) pivoted on the bar 122 and preferably outside of the arm 119, which link is connected to a pivoted frame 126, the swinging end thereof being arranged beneath pawls 92. The upper edge of the free end of this swinging frame is beveled and coöperates with two notches in the under face of each of the pawls 92. When the racks are thrown into engagement with the gears 88, this frame 126 is thrown into engagement with the rearmost notches of all the pawls 92 which remain in their forward positions, and should the rotation of the gears 88 trip the frames 91 the tripped frame will retract, its connected pawl coöperating with the gear-wheel of the next higher order, and in so doing cause the pawl to rise in riding over the beveled edge of the frame 126, with which its rear notch had coöperated, and thus said pawl will not have a dragging action in the reverse direction on the gear-wheel with which it coöperates. When the forward notch of the pawl is in line with the frame 126, the pawl is permitted to drop behind a tooth and is properly centered in position by the coöperation of the beveled edge of the frame 126 with the forward notch of the pawl.

*Clearing the machine or resetting to zero.—* 127 indicates a lever arrranged externally the casing and preferably at the side of the machine, which lever carries a rock-arm 128 on its inner end, said arm having a slot-and-pin connection with a lever 129, pivoted inside of one of the side frames of the machine. This lever 129 is provided with a slot in its rear end for coöperating with a pin 130, projecting from the arm 109. In the ordinary operation of a machine—that is, when the arm 109 is moved backwardly and forwardly by the quadrant 106, this pin 130 idly vibrates in that portion of the slot in the rear end of arm 129 which is concentric with the axis of movement of the arm 109. However, when the lever 127 is moved rearwardly and the front end of lever 129 depressed the rear end of said lever will cause the obliquely-arranged slot to coöperate with the pin 130 and move the arm 109 forwardly, as shown in Fig. 17, so that the pivoted racks 39 will be thrown into engagement with the gears 88 and the dogs 118 thrown out of engagement with said gears. The elevation of the rear end of lever 129 to accomplish this also causes the projection 111 on the lever 110 to be raised out of the groove or slot in the periphery of the quadrant, which is accomplished by means of a projection 131 on the lever 110, which extends laterally over the rear end of lever 129. A spring 132 exerts a pressure to hold the lever 110 down at all times and to likewise hold the rear end of lever 129 depressed by reason of the lateral projection 131. I have shown this lateral projection 131 as carrying guide-pins 133 on each side of the lever 129, so that the projection 111 will be properly guided in its downward movement to reënter the slot in the quadrant.

134 indicates a lever pivoted to the inside of one of the side frames of the machine, (see Figs. 5 and 14,) the rear end of which lever bears against the under side of the pin on the rock-arm 128, (which pin engages the slot in the forward end of arm 129,) while the forward end of this lever 134 carries a frame 135, whose upper cross-bar 136 extends beneath the rear ends of the fingers of the bell-crank levers 44, on which levers are arranged the latch-pins 42, which in ordinary operation prevent the slide-bars 32 from moving forwardly when their friction-drivers are actuated, except when a key has been depressed and a locking-plate 15 coöperates with the bell-crank lever to raise the latch-pin. This cross-bar 136 is held against the rear face of the stationary cross-bar 43 by a spring 137, which spring also tends to hold the rear end of bar 134 against the pin on the rock-arm 128. However, when the lever 127 is moved rearwardly to throw the pivoted racks into engagement with the gears 88 through the instrumentality of the lever 134 and frame 135, with its cross-bar 136, all of the latch-pins 42 are raised out of engagement with the slide-bars 32. Should the operating-handle be now moved forwardly, it will through its friction-drivers move the slide-bars 32 forwardly, and their pivoted racks being in mesh with gears 88 will cause said gears 88 to rotate in a direction opposite from that in which they move ordinarily, such rotation continuing until one of the pins 89 on said gear-wheels arrests further movement of the wheels by coming in contact with the upper edge of the projection 90 on the movable frames 91. When the parts are in this position, all of the indicating-disks 85 exhibit "0" through the sights or windows in the frosted-glass panel arranged thereabove. By pulling the lever 127 forward while the handle is still forward the racks will be disengaged from the gears 88, and the indicating-disks 85 having been returned to "0" will be left in such a position and the machine cleared or reset to zero. The return or rearward movement of the handle only effects the restoration of the bars 32 and their associate parts, the catches 42 falling behind the shoulders at the front ends of the bars when the bars are fully restored.

*Printing mechanism.*—The printing mechanism is best illustrated in Figs. 7 to 13, inclusive.

138 represents type-carrying frames secured to the rear ends of the slide-bars 32, said frames converging, as shown more clearly in Fig. 13, so that they are nested at their upper ends. The upper edge of each type-carrying frame has secured to it the vertical grooved guide-plate 139, (see Figs. 8ª and 31,) in the grooves of which are mounted vertically-movable type 140, said type having laterally-extending heads or projections at its upper and lower ends, the former affording an area of sufficient size for the type proper and also offering a support for the type to hold it in proper position. The projection at the bottom of the type serves to prevent the type from being vertically displaced when struck by a type-hammer in the absence of a platen, and said projection also coöperates with a spring-finger 141, there being one spring-finger for each series of type. These type have printing characters on their upper faces, the first, at the forward end of the carrier, being "0," the following having the printing characters "1" to "9," inclusive, in regular order, "9" being the rearmost type. The "0" type normally occupy the printing-line; but it is obvious that when the slide-bar 32 is moved forward the type-carrier will also be moved with it and present a type in the printing-line having a character corresponding with the number on the depressed key in the keyboard, whose key-stop arrests the slide-bar 32 in such position.

The rear end of the spring-finger 141 is preferably bent up slightly to ride over the projections at the lower ends of the type, and when a type in the printing-line is struck by its hammer to deliver a printing impression said type will move against the resistance of spring 141, which spring will then tend to return the type to its lowermost position, when said type is released by the hammer. In this way a single spring-finger coöperates with the entire series of type, and particularly with the type in the printing-line, so that it is unnecessary to have a separate spring for each movable type in the series.

142 indicates a frame comprising two side plates which are journaled to several shafts of the type-hammer mechanism, said side plates being secured to the top cross-bar 143 of the frame of the machine.

144 indicates a series of independently-movable type-hammers mounted on a shaft 145, said type-hammers delivering impacting blows under the impulse of springs 146. Each type-hammer has a tailpiece 147, carrying pins or projections 148 and 149.

150 indicates a series of independently-movable pawls mounted on a shaft 151. Each pawl is provided with a shoulder on its upper end for coöperating with the pin 148 on the tailpiece of the type-hammer, and a spring 152 tends to hold said shoulder under pin 148, as shown in Fig. 7.

153 indicates a forwardly-extending finger forming a track for coöperating with a pin or projection 154 on one of the type-carrying frames. The rear end of this track is recessed, so as to permit the track to be depressed under the action of spring 152, whereby the upper end of the pawl may coöperate with the pin 148 on the tailpiece of the hammer. Whenever the slide-bar 32 moves forward, the type-carrying frame will be carried with it, and the pin 154 on said frame will elevate the track 153 to a horizontal position, so that the pawl 150 moves rearwardly out of the path of its coöperating pin 148. The length of the track 153 is coextensive with the movement of the type-carrying frame, so that the pin 154 will coöperate with the track in all positions of said type-carrying frame.

From the above it will be seen that whenever an example is set up on the keyboard and the bars 32 moved forward said bars will carry with them their type-carrying frames, and each of said type-carrying frames will elevate its respective track 153, and all of the pawls 150 common to said actuated tracks will be thrown out of the path of movement of their coöperating pins 148 on the tailpiece of the type-hammer. This is what I will term the "individual" controlling mechanism for the type-hammers.

In order to properly explain an important feature of my improved printing mechanism, we will assume that the amount of "$1,025.10" has been set up on the keyboard. This means that the key marked "1" in the thousands-column has been depressed, key marked "2" in the tens-column has been depressed, key marked "5" in the units-column has been depressed, and key marked "1" in the dimes-column has been depressed. No key in the hundreds or cents columns has been depressed. The desirability of having the "0" type print in the hundreds and cents columns will be appreciated, and in order that this may be done automatically, thus obviating the necessity of resorting to tenths or zero keys designed to be depressed to set in action some mechanism which would cause the "0" type to print at the proper place, I provide the pawls 150 with lateral projections 155, (see Fig. 11,) which projections extend in front of and coöperate with the next pawl of lower order, so that irrespective of the fact that no key in a series of lower order has been operated the pawl actuated by any key of higher order will coöperate with and move the pawl of the next lower order, and this last-mentioned pawl will coöperate with and move the pawl of the next lower order, and so on through the lateral projections 155 before mentioned, whereby all the pawls of a lower order than the one actuated will release their respective pins 148 to permit the type-hammers to operate. In the example given the key in the thousands-column having been depressed will permit the slide-bar in the thousands-column to move forward, and in so doing operate the pawl controlled by the type-carrying frame of this column, moving said pawl to the rear. The projection 155 on this pawl in moving rearwardly will actuate or carry with it the next adjacent pawl of lower order, which next adjacent pawl will actuate or carry with it the next pawl of lower order, and so on, to and including the cents-column. However, in the example given, the tens, units, and dimes columns have keys depressed, so that the pawls in these columns do not rely upon the automatic action referred to, they being positively operated. The cents-column, however, must have its pawl thrown into position by this automatic action referred to, and in this respect I will state that I have provided a lateral projection 156 on the pawl in the cents-column, which extends over and coöperates with the pawl in the dimes-column for the purpose of causing the zero-type to print in the dimes-column whenever a key in the cents-column alone is actuated. This is desirable, especially when small amounts are being added in the machine. Any amount less than ten cents will be printed with a "0" character preceding to distinguish it from other numbers which might be printed in other columns.

157 indicates pawls mounted on a shaft 158 in the side plates 142, said pawls having shouldered upper ends for coöperating with the pins 149, projecting laterally from the tailpieces of the hammers. These pawls are normally held under these pins 149 by springs 159, attached to the rearwardly-extending tailpieces thereof. The plates 142 are formed with slots preferably concentric with the shaft 145, upon which shaft and outside said plates are mounted two rock-arms 160 and 161, the ends of said rock-arms carrying a cross-bar 162, which operates in the concentric slots and is arranged under the tailpieces of the type-hammers and above the tailpieces of the pawls 157, with both of which tailpieces said cross-bar coöperates. The link 74 connects the rock-arm 73 and shaft 68 with the arm 160. (See Fig. 9.) Link 74 carries a roller 163, which coöperates with a frame 164, whose members carry a vertically-movable centering-bar 165, which is designed to coöperate with rack extensions 166, extending rearwardly from the type-carrying frames.

The operation of the parts above described is best illustrated in Figs. 7 and 8, wherein it will be seen, with reference to Fig. 7, that when the parts are in their normal position both pawls 150 and 157 are in engagement with the pins 148 and 149 of the type-hammer and that the cross-bar 162 is bearing against the tailpiece of the type-hammer, having restored the same to its elevated position and in so doing stored energy in its spring 146. As shown in Fig. 8, the "5" key of a series has been depressed and the handle has been moved forward to a position wherein the slide-bar 32 is arrested by the key-stop. When the type-carrying frame connected to this bar was moved forward, its pin 154, coöperating with the track 153, forces the individual controlling-pawl out of the path of the pin 148. This change in the position of the parts occurred upon the first movement, and, as stated before, all the pawls 150 to the left, or of lower order, are simultaneously actuated through the medium of the projections 155, while all the pawls 150 in the higher orders are unaffected. At or about the end of the forward movement of the handle, and beyond the extreme limit of movement of the slide-bars 32, the cross-bar 162 is brought into contact with the tailpieces of all of the pawls 157 to disengage said pawls from the pins 149. Those type-hammers which have been released by the pawls 150 will now be free to move upward under the action of their springs 146 to deliver impacting blows on the type in the printing-line, while those type-hammers whose pins 148 are still in engagement with the pawls 150 will remain stationary. Previous to the delivery of the blows by these type-hammers the centering-bar 165 will have entered one of the notches in the rack 166 and brought all of the type in the printing-line into proper alinement. The rearward movement of the handle first permits the centering-bar 165 to be raised by the action of spring 167. (See Fig. 10.) Pawls 157 are permitted to move forward into engagement with the pins 149, cross-bar 162 engages the tailpieces of the actuated hammers and restores them to their normal position, and the pawls 157 fall in place under the pins 149. This series of operations occurs in the order named and during the time that the racks are in engagement with the gears 88. Of course it will be understood that the type-hammers 144 are depressed from engagement with the type, so that said type will be permitted to occupy their proper position by the action of spring 141 before the slide-bars 32 have any movement imparted to them after the handle has started toward its home position. The initial backward movement of the handle is lost so far as restoration of the slide-bars 32 is concerned in order to accomplish the above.

*The ribbon-feed.*—168 represents the impression-ribbon, which travels over the printing-line of type, being guided by suitable idle rollers to keep this path, the ends of said ribbon being secured to spools 169 and 170. These spools are mounted upon and designed to turn with shafts 171 and 172, which shafts carry at their forward ends ratchet-wheels 173 and 174. (See Figs. 31 to 33.)

175 indicates a plate preferably slotted at its ends for the passage of the shafts 171 and 172, said plate carrying a rotary disk 176 at about its center. A pawl 177, pivoted to the plate, coöperates with two notches in the periphery of this disk, a spring 178 holding said pawl into engagement with the disk.

179 and 180 indicate two pawls mounted on the disk 176, the pivotal points of said pawls being preferably coincident, and to the stud forming said pivotal point is connected one end of the spring 178, as shown in Fig. 32. These disk pawls coöperate with the ratchets on the spool-shafts. A spring 181, preferably a torsion-spring, wound around the pivotal point of the pawls and having its ends arranged under lateral pins or projections extending from said pawls, tends to hold the pawls 179 and 180 in elevated positions.

The disk 176 carries two pins 182 and 183, which are designed to coöperate with the pawls 179 and 180, respectively, and when either of said pins is in engagement with its respective pawl said pawl is depressed out of the path of its coöperating ratchet-wheel, while the other pin will be out of engagement with its pawl, permitting said pawl to be in operative position with respect to this ratchet.

184 indicates a link pivotally connected to the plate 175 and to the end of a rock-arm 185, mounted on a shaft 186. The inner end of this shaft 186 carries a rock-arm 187, loosely mounted thereon and provided with a projection 188, designed to coöperate with a pin 189 on said shaft, a spring 190 holding the arm against the pin 189, thus making said arm yielding in one direction.

A link 191 connects the arm 187 to the forward end of lever 71, (see Fig. 13,) which lever 71, as before described, carries the plunger which operates in the dash-pot, said lever being rocked by a link 70, connected to a rock-arm 69 on the rock-shaft 68. It will thus be seen that whenever the handle is operated the plate 175 will be vibrated through the connections just mentioned.

It is desirable that the ribbon-feed in machines of this character be automatic and that when the ribbon is wound on one spool and unwound from the other the feeding mechanism be automatically reversed, thus avoiding the necessity of the operator's attention being constantly directed to this part of the machine. It will be obvious that when either of the pawls is in engagement with its respective ratchet-wheel the ribbon will be fed in one direction, the other pawl being out of engagement; further, that both pawls cannot be in engagement with their ratchet-wheels at the same time, the pawl or dog 177 throwing the disk on either side of a dead central position to prevent this.

Assuming now that the ribbon is wound on spool 170 and the other end of the ribbon connected to the spindle of spool 169, the vibration of plate 175 will cause the pawl 179 to wind the ribbon on spool 169 from the spool 170, this operation continuing until all the ribbon is unwound from the spool 170. The end of the ribbon being attached to spool 170 will naturally cause said ribbon to be drawn taut under the efforts of the pawl 179 to turn the spool 169, and this tension which is placed on the robbon and the efforts of this pawl to turn spool 169 in a winding direction are utilized to cause the ribbon-feed to reverse itself under these conditions, so that the ribbon will be rewound on spool 170. When the ribbon is drawn taut, the spool 170 is of course stationary, and the spool 169 is likewise stationary, having wound as much of the ribbon thereon as it can possibly wind, and when the plate 175 moves to the left, with its pawl 179 in engagement with the ratchet 173, as shown by dotted lines in Fig. 33, the ratchet-wheel resisting motion will cause pawl 179 to act on the disk 176, so as to force the dog 177 out of the notch with which it engages, (see Fig. 32,) and the instant that the apex of this dog passes the projection intermediate the two notches the spring 178 will draw the end of the dog down into the second notch, (see Fig. 33,) and in so doing cause the disk to rotate and be held in this new position by the spring 178 passing a line of dead-center. This new position of the parts is shown in full lines in Fig. 33. The pin 182 on the disk now forces the pawl 179 out of the path of the ratchet-wheel 173, and the pin 183, which heretofore has held the pawl 180 out of engagement with the ratchet 174, permits said pawl to rise into engagement with said ratchet, so that continued vibration of the frame 175 will cause the ribbon to be wound on spool 170. The yielding rock-arm 187 is employed for the purpose of applying a gradual strain to the ribbon when wholly unwound from a spool in order to prevent damage, which might result from strong pulls from positive mechanism.

As stated before, the vibrations of frame 175, when the pawl 180 is in engagement with its ratchet, will cause the ribbon to be wound on spool 170. When spool 169 is exhausted, the ribbon will again be placed under tension, and the pawl 180, coöperating with a firm or unyielding ratchet-wheel, will exert sufficient back pressure on the disk 176 to rotate the same, so that the dog 177 will ride into the other notch, as shown in Fig. 32, and so reverse the position of the pawls so that the ribbon will be wound on spool 169.

*The paper-feed.*—As shown in Figs. 8, 9, and 10, the rocking frame 161 carries a link 192, which has a slot-and-pin connection with a spring-pressed lever 193, projecting up through an opening in the top of the casing 2. (See also Fig. 34.) This lever 193 is therefore rocked whenever the handle is operated and is employed to drive the platen-roller of a paper-feeding device, whose construction is shown in Figs. 1, 2, 34, and 35. This paper-feeding mechanism is in the form of a carriage, somewhat resembling the carriage of a type-writing machine, and consists of a frame 194, pivoted in suitable lugs 195, extending upwardly from the casing 2. The forward end of the carriage carries a roller 196, riding upon a track 197, secured to the casing 2, said track being notched on its under side, as at 198, at appropriate points, with the notches of which track coöperates a pivoted locking-pin 199, carried by a handle 200. This handle 200 is spring-pressed, as seen in Fig. 34, so that whenever the carriage is in its lower position the pin 199 is forced into engagement with one of the notches 198 of the track.

201 indicates the platen-roller, mounted in the carriage-frame and preferably extending entirely across the top of the machine, said roller having a ratchet-wheel 202 conjoined thereto, with which coöperates a pawl 203, arranged on a pawl-carrying arm loosely mounted on the shaft of the platen-roller, a link 204, connecting said pawl-carrying arm with a rocking frame 205, carrying a cross-bar 206, with which coöperates the lever 193. A handle may be arranged on the pawl in order that said pawl may be manually raised out of engagement with its ratchet should it be desired to turn the paper in a direction reverse from that in which it is fed. The ends of the shaft of the platen-roller have milled disks 207, (see Fig. 1,) by which the platen-roller may be turned by hand.

Open-ended slots are provided in the side frames of the carrier, in which slots is arranged the shaft of an idle roller 208, a spring 209 forcing said roller to bear against the platen-roller 201. This idle roller 208 is preferably made up of short sections, as shown in Fig. 1, in order that the paper-feed may be even throughout the length of the roller. The paper-guide 210 coöperates with the platen-roller 201 for well-understood purposes, and a bracket 211 is preferably mounted on the rear end of the carriage for carrying a roll of paper to be printed upon.

In order to adjust the platen-roller toward and from the type, I provide an adjusting-screw 212 at the rear end of a pivoted frame carrying a track 213, on which the carriage-frame proper is pivoted by suitable lugs. The carriage is thus provided with a double-jointed hinge and may be raised to swing on the track 213, or the frame carrying the track 213 may also be swung back.

To prevent the pawl 203 from moving the platen more than the distance of one tooth, I arrange a pawl $203^a$ to engage and coöperate with a ratchet $202^a$, whose teeth are oppositely disposed to those of the ratchet 202.

Pawl $203^a$ is provided with a projection $203^b$, which coöperates with the pawl 203 in such manner that as the link 204 moves the pawl 203 forwardly, (see Fig. 35,) so that pawl 203 will ride over a tooth, the pawl 203 will cause the pawl $203^a$ to likewise rise and release the tooth which it formerly engaged. When pawl 203 is at the forward extremity of its movement, it falls in front of the tooth over which it has ridden and permits the pawl $203^a$ to rest upon the tooth which it formerly engaged. The movement of the link 204 to the rear will draw pawl $203^a$ and so rotate the ratchet 202 until the pawl $203^a$ contacts with the shoulder of the next tooth (on ratchet $202^a$ conjoined to ratchet 202) and so arrests the rotation of the platen. By this construction the paper can only be fed the distance of one tooth whenever the frame 205 is vibrated. When it is desired to manually rotate the platen, the pawl 203 is moved forward until the projection $203^b$ on pawl $203^a$ falls into a notch $203^c$ on pawl 203, whereby both pawls are held out of engagement with their respective ratchets and the platen can be rotated by hand in either direction.

In ordinary operation, where the amounts are to be printed on a strip of paper, as usual, the roll of paper is arranged in the bracket 211, the forward end being fed under the platen-roller, as is well understood. The carriage is now arranged centrally relative to the machine and the amounts are printed on the paper, and after a total is struck the printed portion of the paper may be severed from the roll.

It is desirable in some instances to print parallel columns on sheets of paper, and to do this the strip from the roll is withdrawn from the platen and a wide sheet of paper introduced under the platen similar to the introduction of a sheet of paper under the platen of a type-writing machine. If the paper is to be straightened after it is introduced, either end of the idle roller 208 may be moved outwardly by hand and the paper adjusted properly.

Assuming now that it is desired to print a column of figures at the left-hand side of the wide sheet of paper so introduced, the handle 200 is lifted and the carriage moved to the right until the locking-pin engages the extreme notch to the right on the under side of the track 197. If the column of figures is completed at the left-hand side of the sheet, the total may be struck and the sheet either removed or turned back and the carriage adjusted to the next adjacent notch to the left, when the total in the machine may be printed at the top of the second column, or if it is desired to reset the machine when the total is printed at the bottom of the first column the machine may be cleared and a fresh start made on the second column. As each column is finished the carriage is adjusted laterally, there being five notches on the under side of the track-rail, each notch being spaced the proper distance apart, so that the adjustment of the carriage, as determined by these notches, will properly space the different columns of figures from each other.

No matter what lateral position the carriage may be in the lever 193 always coöperates with the cross-bar 206, which extends the entire width of the carriage.

After the handle has been operated and a number printed on the paper the carriage can be raised and the printing readily inspected. The handle 200 will naturally be grasped to raise the carriage to inspect the last number printed, and in so doing will bring its locking-pin out of engagement with the track-notch, and when the carriage is lowered, even though it should be accidentally moved laterally, the pin 199, being out of register with a notch, will cause the handle 200 to remain in an elevated position to indicate that the carriage is not in the proper place, so that the operator will move the carriage laterally and the pin will drop into its proper notch and not compel the operator to raise the carriage again.

*Taking the total.*—I have heretofore described the operation of clearing the machine, stating that the lever 127 was moved to the rear to engage the racks with the gears 88 and the handle moved forward until the pins on said gears contacted with the projections 90 to arrest the gear-wheels and their meshed indicators in a "0" position and that when the handle had reached its forward position if the lever 127 was pulled forward to depress the racks out of engagement with the gears the indicators would exhibit "0," when the handle could be moved rearwardly to its normal position ready for operation, with the machine cleared.

Part of the operations above described are effected in taking a total or in printing the numbers exhibited by the indicating-disks 85. While the handle is in its normal position—to the rear—the lever 127 is moved to the rear to engage the racks with the gears 88, and the handle is now pulled forward, rotating the gears in a reverse direction. It will be obvious that if an indicating-wheel exhibited "1" through the sight-opening the pin 89 would be the distance of one gear-tooth from the projection 90 and that the gear would move that distance before it was arrested. If the numeral "2" were exhibited through the sight-opening, the gear would move reversely the distance of two teeth, and so on up to "9." If the indicator exhibited "0," the gear would remain stationary, the friction device permitting this. Depending, then, upon the distance of the pins 89 from the projections 90 the gears will permit the bars 32 to move forward, so that the carried type will be brought into printing-line and present characters in said line corresponding to the numeral formerly exhibited through the sight-opening of that column to which said indicating-disk, its associate slide-bar, and printing-type are common. The handle upon reaching its forward limit will cause the type-hammers to deliver blows on the type in the printing-line. Thus said type will print the amount formerly exhibited by the indicating-disks, although said indicating-disks will at the time of printing exhibit "0" throughout the sight-openings. If it is desired to keep the total in the machine, the lever 127 is left in its depressed rearward position and the handle returned. The friction device operating upon the return movement of the handle will restore the slide-bars 32 to their normal positions, and the racks being still in engagement with the gears 88 will rotate said gears until said slide-bars are arrested by the forward walls of the slot 34 contacting with the cross-bar 35. (See Fig. 7.) This cross-bar arrests the bars 32 in their rearward movement and determines the rotation of the gears, so that when the handle reaches its normal or rear position the indicators will be rotated so as to exhibit the amount they formerly exhibited or the total which has been printed. If it is desired to carry this total to the top of another column, the machine is left in this condition and the paper turned back, as before described, and the total again struck at the top of the next column. If it is desired to add to that total without clearing the machine, the lever 127 is pulled forward when the operating-handle is in its rear position, thus leaving the total in the machine. If it is desired to clear the machine, as before described, the lever 127 would be pulled forward when the operating-handle is in a forward position. It will thus be seen that the lever 127 can be pushed to the rear, the total printed, and if said lever 127 is pulled forward when the operating-handle is forward the machine will be cleared, or if said lever 127 is not pulled forward until after the operating-handle reaches its rear position the total will be printed and left in the machine.

*Printing the total in a distinguishing color.*—In Figs. 36, 37, and 38 I have shown means whereby whenever a total is taken in the machine the impression on the strip or sheet of paper will be in a different color or have some distinguishing characteristic to identify it as a total or the sum of the numbers in the machine, and the mechanism for accomplishing this consists, briefly stated, in arranging an inking-ribbon of different color in juxtaposition to the ribbon ordinarily employed for regular operations of the machine.

214 indicates frames carrying idle rollers at their upper inner edges for guiding the inking-ribbons across the printing line of type. These frames are slidingly mounted upon the shafts 171 and 172 and also coöperate with stationary guide-rods 215, as shown in Figs. 37 and 38. These frames contain twin ribbon-spools around which the ribbon 168, which ribbon is employed in ordinary operation of the machine, is wound, while a ribbon 216, to which I will apply the term of "total-ribbon" runs parallel to the ribbon 168, as shown in Fig. 38. These twin spools are keyed to the shafts 171 and 172, so as to turn therewith and be permitted to move longitudinally thereof.

217 indicates a rock-shaft mounted in suitable bearings upon which are arranged rock-arms 218, connected by links 219 to the frames 214. A rock-arm 220 on one end of the rock-shaft is connected by a link 221 to one end of a lever 222, whose other or forward end bears upon and coöperates with the rear end of lever 129, a spring 223 holding the forward end of lever 222 in engagement therewith.

In taking a total the lever 127 is moved rearwardly to elevate the rear end of lever 129, which causes the shaft 217 to be rocked through the connections just mentioned, and in so doing displace the ribbon 168 from the printing-line, moving it rearward in this instance and coincidently placing the total-ribbon 216 over the printing-line in order that when the type are elevated to deliver a printing impression—the total of the machine—the type will force the ribbon 216 against the paper and so leave an impression in a color different from that made on the paper in the ordinary operation of the machine. When the lever 127 is restored to its normal position through the connections hereinbefore described, the frames 214 are moved so as to displace the total-ribbon from the printing-line and restore the ribbon 168 to its normal or usual position. The reversing mechanism for the ribbons is arranged on the forward ends of shafts 171 and 172, as heretofore described, and in practice the ribbons 168 and 216 are preferably of the same length, and being fed in unison will be drawn taut simultaneously to effect the reversing mechanism; but, with respect to this, should one ribbon be drawn taut and the other remain slack the reversal of the winding mechanism will be accomplished by the single taut ribbon.

The advantage of having the total printed in a distinguishing color from amounts or items of which it is composed will be readily appreciated. In machines of this character with which I am familiar the total is printed in the same color as the items, and there is nothing to distinguish the total from the items except perhaps a space. In the construction I have described herein the operator is not required to perform any other than the usual operation of operating the total-key, which total-key, when operated automatically, effects a change in the inking device for the type, so that the total when struck will be printed in a color different from that employed with respect to the printing of the different items.

I am aware that many minor changes in the arrangement, construction, and combination of the several parts of my improved calculating-machine can be made and substituted for those herein shown and described, and therefore I do not wish to be understood as limiting myself to the exact details of construction and arrangement of the parts as herein shown, except as such restrictions are imposed in the following claims.

Having thus described my invention, what I claim, and desire to secure by Letters Patent, is—

1. The combination with a series of depressible keys, of means for holding said keys in a depressed position, whereby they act as stops, a slide-bar common to said series of keys and provided with lateral projections designed to coöperate with the stops set up by the different keys in their depressed position, a rack pivoted to said slide-bar, an adding-wheel designed to mesh with said rack, an operating-handle, friction devices interposed between said operating-handle and said slide-bar, whereby said slide-bar is moved forwardly by friction until arrested by one of the depressed keys, and means for throwing the rack into engagement with the adding-wheel after the slide-bar has completed its forward movement; substantially as described.

2. The combination with a series of adding-wheels, of a series of independently-movable keys for each wheel, a separate stop designed to be set up by each key, a slide-bar common to said series of keys and provided with lateral projections coöperating with the stops set up by the keys, a rack pivoted to said slide-bar, an operating-handle, friction devices interposed between said operating-handle and said slide-bar, whereby, said slide-bar is moved forwardly by friction until arrested by one of the key-stops, means connected with the operating-handle for throwing the rack into engagement with the adding-wheel after the slide-bar has completed its forward movement, the friction devices operated by the handle restoring the slide-bar and rotating its meshed adding-wheel, and means for throwing the rack on the slide-bar out of engagement with the adding-wheel when the operating-handle reaches the limit of its return movement; substantially as described.

3. The combination with a series of independently-movable keys whose shanks are staggered, the heads of said keys being in alinement, of lateral projections extending from the key-shanks, a pivoted wing in the path of said projections, a locking-plate which is held in a retracted position by said wing, and means on said plate for locking a depressed key in its lowered position, and the rest of the keys of that series in their elevated position; substantially as described.

4. The combination with a series of independently-movable keys whose shanks are notched, of lateral projections extending from said shanks, a latch-plate in the path of said projections, a sliding locking-plate held in a retracted position by the latch-plate, and a spring whose ends are connected to said latch-plate and sliding locking-plate, respectively; substantially as described.

5. The combination with a series of independently-movable keys whose shanks are staggered and provided with notches, of lateral projections on said key-shanks, a pivoted wing in the path of said projections, a locking-plate which is controlled by said pivoted wing, said locking-plate being provided with shoulders on each side for coöperating with staggered key-shanks, and means for forcing the locking-plate forward whenever the pivoted wing is depressed; substantially as described.

6. The combination with a series of keys, of projections arranged on the shanks thereof, a pivoted wing in the path of said projections, a sliding locking-plate, a stop on said locking-plate coöperating with the projections on the pivoted wing, and a spring whose ends are connected to said pivoted wing and to the locking-plate, respectively; substantially as described.

7. The combination with a series of independently-movable keys designed to set up stops, of means coöperating with said keys for locking the depressed key in its lowermost position, and the remaining keys of that series in their elevated position, and a spring common to a plurality of keys of that series for restoring the depressed key to its elevated position after said key has been released by the locking-plate; substantially as described.

8. The combination with a series of independently-movable keys, of means for locking the depressed key of the series in its lowered position, and the remaining keys of that series in their elevated position, a slide-bar provided with projections, one of which coöperates with the depressed key, and a lock for said slide-bar, said lock coöperating with the key-lock in such manner as to release the slide-bar upon the depression of any key in the series; substantially as described.

9. The combination with a series of independently-movable keys whose shanks are staggered, said keys, when depressed, forming stops, of a slide-bar provided with projections for coöperating with the key-stops, alternate projections on the slide-bar extending in opposite directions; substantially as described.

10. The combination with a series of staggered key-stops, of a slide-bar occupying a medial line with respect to said series of staggered key-stops, projections on said slide-bar, alternate projections extending in opposite directions, and means for moving said slide-bar longitudinally whereby one of its carried projections will coöperate with one of the key-stops; substantially as described.

11. The combination with a staggered series of key-stops, of a slide-bar traveling in a medial line between said stops, projections on said slide-bar for coöperating with the key-stops, each projection on the slide-bar individually coöperating with its respective key-stop, and means for moving said slide-bar longitudinally, whereby its projections coöperate with their respective key-stops; substantially as described.

12. The combination with several series of keys, of a slide-bar common to each series of key-stops on said slide-bars for coöperating with the shanks of the depressed keys, latches or locks for said slide-bars, mechanism which is operated by any key of a series for locking said key in its depressed position, and the remaining keys of that series in an elevated position, said mechanism also releasing the slide-bar common to the series wherein the key is operated, and means for imparting longitudinal motion to the slide-bar after its release; substantially as described.

13. The combination with several series of keys, of slide-bars common to each series of keys, stops on the slide-bars for coöperting with the shank of a depressed key in the series to which said slide-bar is common, mechanism which is thrown into action by the depression of a key in a series to lock said key in its depressed position, and the remaining keys of that series in an elevated position, said mechanism releasing the slide-bar common to that series of keys, friction devices in engagement with the slide-bars for moving the same forward until one of the stops thereof contacts with its respective key-shank, and means for moving said friction devices a predetermined distance irrespective of the arrest of the driven slide-bar short of the limit of movement of the friction devices; substantially as described.

14. The combination with a keyboard comprising series of independently-movable keys, of a sliding plate common to each series of keys, levers in the paths of said sliding plates, latch-pins operated by the several levers, and slide-bars coöperating with said latch-pins; substantially as described.

15. The combination with a keyboard comprising series of independently-movable keys, of sliding plates common to the several series of keys, bell-crank levers having one member in the path of a sliding plate, latch-pins coöperating with the other member of said bell-crank levers, and slide-bars which are released whenever the latch-pins are raised; substantially as described.

16. The combination with a keyboard comprising series of independently-movable keys, of locking-plates common to the several series of keys and which are designed to move forward whenever a key in a series to which the plate is common is depressed, bell-crank levers 44 having one member in the path of movement of a plate, a latch-pin 42 formed with an opening for receiving the other member of said bell-crank lever, a bar 43 in which said latch-pins operate, and slide-bars 32 having shoulders 41 for coöperating with the latch-pins, said slide-bars being guided in their movements by the bar 43; substantially as described.

17. In a calculating-machine, the combination with a keyboard comprising series of independently-movable keys, of locking-plates common to the several series of keys for locking a depressed key in its lowered position, and the remaining keys in an elevated position, slide-bars which are movable independently of said locking-plates, and a handle connected to said bars for operating the same, and devices operated by the handle for restoring all of the locking-plates to effect the release of the depressed keys; substantially as described.

18. In a calculating-machine, the combination with a series of independently-movable keys, of locking-plates common to the several series of keys for locking any depressed key of a series in its lowered position, and the remaining keys of that series in an elevated position, a pivoted frame against which the locking-plates abut in their forward movement, and a lever for operating said frame and effecting a manual restoration of the locking-plates to release all of the depressed keys; substantially as described.

19. In a calculating-machine, the combination with a keyboard comprising series of independently-movable keys, of locking-plates common to the several series of keys for locking the depressed key in its lowered position, and the remaining keys in an elevated position, a series of latch-pins coöperating with the locking-plates, slide-bars provided with projections for coöperating with stops set up by the different keys, a handle for moving said slide-bars forwardly until they are arrested by the key-stops, adding-wheels, means for connecting the adding-wheels with the slide-bars after said bars have been arrested, a rearward movement of the handle restoring the slide-bars and rotating their connected adding-wheels, and mechanism connected with the handle for restoring the locking-plates and releasing the keys only when the handle has started on its rearward movement; substantially as described.

20. The combination with a keyboard for setting up stops, in which keyboard are included sliding plates for holding the operated keys in a depressed position, of slide-bars coöperating with the key-stops, adding-wheels, which are connected with the slide-bars when said bars are arrested in their forward movement by the key-stops, latch-pins coöperating with the slide-bars and with the locking-plates, springs for holding said latch-pins in position against the slide-bars, a bar common to all of the locking-plates, and mechanism operated by the handle for actuating said bar to restore the locking-plates and release the keys, said mechanism also relieving the latch-pins of restraint so that they are in position to coöperate with their respective slide-bars; substantially as described.

21. The combination with a keyboard for setting up stops, in which keyboard are included sliding plates for locking operated keys in a depressed position, of levers in the path of movement of said locking-plates, latch-pins operated by said levers, a rocking frame for coöperating with the sliding plates, a cam-shaft coöperating with the rocking frame, a tappet on the end of said cam-shaft, an operating-handle, and means connected to said handle and coöperating with said tappet for rocking the frame when said handle is moving in one direction; substantially as described.

22. The combination with a keyboard, in which are included sliding locking-plates, of a rocking frame for coöperating with said plates, a cam-shaft for rocking said frame, a tappet mounted on said cam-shaft, a sliding rod provided with a lateral projection for coöperating with said tappet, and an operating-handle for moving said sliding rod; substantially as described.

23. The combination with a keyboard, in which are included locking-plates, of an operating-handle, mechanism operated by said handle for restoring said locking-plates, and means for rendering the restoring mechanism operated by the handle, inoperative; substantially as described.

24. The combination with a keyboard, in which are included locking-plates, of a rocking frame for restoring said plates, an operating-handle, mechanism actuated by said handle for rocking said frame to restore the plates, and devices under control of the operator for rendering the handle-operated mechanism, inoperative; substantially as described.

25. The combination with a keyboard, in which are included sliding locking-plates, of a rocking frame for restoring said plates, a cam-shaft for rocking said frame, a tappet on said cam-shaft, an operating-handle, devices operated by said handle for engaging said tappet and rocking the cam-shaft in one direction, and a manually-operable device for engaging the tappet and throwing it out of the path of the handle-operated mechanism; substantially as described.

26. The combination with a keyboard in which are included sliding plates, of a rocking frame for restoring said plates, a cam-shaft for rocking said frame, a tappet loosely mounted on said shaft and locked against independent rotation in one direction, an operating-handle, a slide-bar provided with a lateral projection for coöperating with the tappet and rocking the cam-shaft in one direction, and a repeating-key for coöperating with said tappet and idly rotating the same on the cam-shaft to throw said tappet out of the path of movement of the handle of the operated mechanism; substantially as described.

27. The combination with a series of independently-movable slide-bars, of latches or detaining devices coöperating therewith, a bar common to all of said detaining devices, a lever for operating said bar, and an operating-lever 127 for actuating said last-mentioned lever; substantially as described.

28. The combination with a series of sliding bars, of detents therefor, a bar common to all of said detents, a lever 127, a rocking arm connected with said lever, and connections between said rocking arm and said bar for simultaneously operating said detents; substantially as described.

29. The combination with sliding bars, of detents therefor, a frame carrying a bar designed to simultaneously engage said detents, a lever for operating said frame, a rocking arm with which said lever coöperates, means for rocking said arm, and a spring for holding the frame and lever in position; substantially as described.

30. The combination with sliding bars, of rock-arms connected therewith, and friction devices for moving said rock-arms and their connected sliding bars.

31. The combination with sliding bars, of rock-arms connected therewith, and friction devices for moving said rock-arms and their connected sliding bars, said friction devices comprising spring-pressed balls engaging said rock-arms; substantially as described.

32. The combination with sliding bars, of a driving-shaft, arms loosely mounted on said shaft, and having a slot-and-pin connection with said bars, and fixed arms on said driving-shaft carrying spring-pressed balls for coöperating with the loosely-mounted bar-arms; substantially as described.

33. The combination with sliding bars, of a shaft, arms 49 loosely mounted on said shaft and connected to said bars, rock-arms fixedly mounted upon said shaft, and carrying spring-pressed balls in their outer ends for coöperating with the arms 49, said arms 49 being provided with recesses or openings in the paths of the spring-pressed balls; substantially as described.

34. The combination with sliding bars, of a shaft 50, means for rocking said shaft, arms 49 loosely mounted upon said shaft and having slot-and-pin connections with said sliding bars, said arms being also provided with track extensions, rocking arms 52 fixedly mounted on said shaft, and spring-pressed balls mounted in the ends of said arms 52, and coöperating with the arms 49, said arms 49 being recessed in the paths of the balls to afford seats or sockets therefor; substantially as described.

35. The combination with the main driving-shaft 57, of a handle for operating said shaft, a rock-arm on said shaft, a slide-bar having a link connection with said rock-arm, a rack on said sliding bar, a segment in mesh with said rack, a shaft which is rocked by said segment, and a dash-pot whose plunger is vibrated by said last-mentioned rock-shaft; substantially as described.

36. The combination with a rock-shaft, of a notched disk 75 mounted thereon, oppositely-extending lateral projections on said disk, a double-ended pawl coöperating with the notches in said disk, and tappets conjoined to said pawl and coöperating with the projections on the disk to throw one or the other end of said pawl into engagement with the disk; substantially as described.

37. The combination with sliding bars, of pivoted racks carried thereby, adding-wheels, a rocking frame for throwing said racks into and out of engagement with said adding-wheels, an operating-handle and frictional devices between said handle and racks for frictionally driving said racks in a forward direction, said handle rocking the frame to throw said racks into engagement with the adding-wheels, and returning said racks to rotate said adding-wheels; substantially as described.

38. The combination with sliding bars, of racks pivotally connected therewith, a rocking frame for carrying the free ends of said racks, an arm 109 for rocking said frame, adding-wheels, and an operating-handle for rocking the arm 109 and said frame and throwing the free ends of the pivoted racks into and out of engagement with the adding-wheels; substantially as described.

39. The combination with sliding bars, of pivoted racks connected therewith, said racks being slotted at their free ends, a rocking frame provided with a cross-bar passing through the slots in the free ends of the pivoted racks, an arm 109 for rocking the frame, and an operating-handle for rocking said arm 109 to raise and lower the free ends of the racks; substantially as described.

40. The combination with sliding bars, of racks pivotally connected therewith and having their free ends slotted, adding-wheels with which said racks are designed to mesh, a rocking frame carrying a member which passes through the slots in the pivoted racks, an arm 109 for rocking said frame, locking-dogs for the adding-wheels, and means on said rocking frame for coöperating with said dogs to unlock or release the adding-wheels whenever the racks are thrown into engagement therewith; substantially as described.

41. The combination with sliding bars, of slotted racks pivotally connected therewith, a rocking frame having a member which passes through the slots in said racks, an arm 109 for rocking said frame, adding-wheels with which the racks are thrown into and out of engagement when the rocking frame is actuated, transferring devices for actuating the next adjacent adding-wheels of higher order, and a centering device actuated by said rocking frame, and coöperating with the transferring devices; substantially as described.

42. The combination with slide-bars, of racks pivotally connected therewith, a rocking frame for raising and lowering the free ends of said racks, an arm 109 for rocking said frame, adding-wheels, transferring devices coöperating with said adding-wheels to impart motion to the next adjacent adding-wheel of higher order, an operating-handle for restoring the slide-bars and their carried racks to rotate the adding-wheels, and mechanism positively operated by the operating-handle previous to its restoring movement for actuating the transferring devices; substantially as described.

43. The combination with sliding bars, of pivoted racks carried thereby, adding-wheels, a rocking frame for throwing said racks into and out of engagement with said adding-wheels, transferring devices which are tripped by the adding-wheels, key-stops for arresting forward movement of the sliding bars, frictional devices moving said sliding bars forwardly, an operating-handle for actuating said frictional devices, and mechanism for restoring the tripped transferring devices, said mechanism comprising a shaft, on which is arranged a series of projections in spiral order; substantially as described.

44. The combination with adding-wheels and means for operating the same, of transferring devices which are tripped by said adding-wheels, a shaft provided with projections arranged in spiral order for restoring the tripped transferring devices, and so actuating the next adjacent adding-wheel of higher order, a pinion loosely mounted on said shaft, a pawl carried by said pinion, a ratchet-wheel fixedly mounted on the shaft with which said pawl coöperates, a segment in mesh with the pinion, an operating-handle, and a cam driven by said operating-handle for rocking the segment, whereby said shaft is positively driven only when the handle is moving in a forward direction; substantially as described.

45. The combination with transferring devices, of a shaft provided with projections for actuating the same, a pinion loosely mounted on said shaft, a rachet-wheel fixedly mounted on the shaft, a pawl carried by the pinion and coöperating with said ratchet-wheel, and a friction-brake conjoined to the pinion, and bearing upon said shaft; substantially as described.

46. The combination with transferring devices, of a shaft provided with projections for actuating the same, ratchet-wheels fixed on said shaft, a stationarily-mounted pawl for coöperating with one of said ratchet-wheels to prevent the return movement of the shaft, a pinion loosely mounted on said shaft, a driving-pawl conjoined to said pinion for coöperating with the other of said ratchet-wheels, means for rotating said pinion in opposite directions, and a friction-brake carried by the pinion, and embracing said shaft; substantially as described.

47. The combination with vertically-immovable slide-bars, of racks pivoted to said slide-bars, adding-wheels, a rocking frame for throwing said racks into and out of engagement with said adding-wheels, and means for operating said rocking frame, said means comprising a rock-arm provided with a cam-groove, with which groove coöperates a roller on said rocking frame; substantially as described.

48. The combination with adding-wheels, of pivoted racks coöperating therewith, and a rocking frame moving said racks into and out of engagement with the adding-wheels, a cam for moving said frame, a slotted quadrant, and connections between said quadrant and cam; substantially as described.

49. The combination with adding-wheels, of pivoted racks, a frame for throwing said racks into and out of engagement with said adding-wheels, a cam for moving said frame, a friction device coöperating with said cam, an arm 110 connected to said cam, and provided with a finger 111, and a quadrant provided with stops for coöperating with said finger to move the cam in opposite directions; substantially as described.

50. The combination with adding-wheels, of vertically-immovable slide-bars, pivoted racks carried by slide-bars, a rocking frame for throwing said racks into and out of engagement with said adding-wheels, a cam for moving said rocking frame, a lever 129 for operating said cam, and a handle 127 coöperating with said lever; substantially as described.

51. The combination with adding-wheels, of pivoted racks, a rocking frame for throwing said racks into and out of engagement with said adding-wheels, an operating-handle, connections between said operating-handle and said rocking frame for actuating the latter, and manually-operable devices for throwing the racks into and out of engagement with the adding-wheels, said manually-operable devices, when moved to a position to throw the racks into engagement with the adding-wheels, rendering inoperative the connections between the rocking frame and the operating-handle; substantially as described.

52. The combination with adding-wheels, of racks for driving the same, an operating-handle, connections between said operating-handle and racks whereby the racks are thrown into and out of engagement with the adding-wheels and motion imparted thereto for rotating said wheels, and manually-operable devices for rendering inoperative the connections between the racks and the adding-wheels with respect to said connections throwing the racks into and out of engagement with the adding-wheels, said manually-operable devices, however, not interfering with the motion communicated by the operating-handle to move the racks to rotate the wheels; substantially as described.

53. The combination with adding-wheels provided with pins, of stops, which yield when the wheels are rotated in one direction, but which arrest the wheels when rotated in an opposite direction, slide-bars, racks pivoted to said slide-bars, key-stops for said slide-bars, an operating-handle, connections between said handle and said bars for moving the same forward until arrested by said key-stops, connections operated by the handle for throwing the racks into engagement with the adding-wheels, restoring the bars, rotating the adding-wheels, and disengaging the racks from the adding-wheels when the handle reaches its rearmost position, and manually-operable devices for throwing the racks into engagement with the adding-wheels when the handle is in its rearmost position, whereby when said handle is moved forward the adding-wheels are rotated reversely until arrested by their stops, and when said manually-operable devices are returned to their normal position, the adding-wheels are at zero, and the machine cleared; substantially as described.

54. The combination with adding-wheels provided with pins, of stops, which yield when the wheels are rotated in one direction, but which arrest the wheels when rotated in an opposite direction, slide-bars, racks pivoted to said slide-bars, key-stops for said slide-bars, an operating-handle, connections between said handle and said bars for moving the same forward until arrested by said key-stops, connections operated by the handle for throwing the racks into engagement with the adding-wheels, restoring the bars, rotating the adding-wheels, and disengaging the racks from the adding-wheels when the handle reaches its rearmost position, manually-operable devices for throwing the racks into engagement with the adding-wheels when the handle is in its rearmost position, whereby when said handle is moved forward the adding-wheels are rotated reversely until arrested by their stops, and when said handle is returned, the adding-wheels and racks are returned to their normal position, and stops on the sliding bars for determining the movement thereof and of the adding-wheels when said bars are returned to their normal position; substantially as described.

55. The combination with adding-wheels, of sliding bars, slotted racks pivoted to said bars, a rocking frame carrying a cross member which passes through the slots in said racks, a projection 116 on said frame for releasing or unlocking the adding-wheels when the racks are thrown into engagement therewith, a rock-arm 109 provided with a cam for rocking said frame, a quadrant, an arm 110 provided with a projection for coöperating with said quadrant to move the arm 109, a lever 129 provided with a slot, through which passes a pin on the arm 109 for rocking said arm, and a handle or lever 127 for rocking the lever 129; substantially as described.

56. The combination with adding-wheels, of pivoted racks, a rocking frame for throwing said racks into and out of engagement with the adding-wheels, an arm 109 provided with a cam-groove for rocking said frame, a slotted quadrant 106 provided with stops 107 and 108, an arm 110 pivoted on the arm 109 and provided with a finger for coöperating with the quadrant-stops, a lever 129 for rocking the arm 109, a handle for moving the lever 129, and means for elevating the arm 110 out of engagement with the quadrant whenever the arm is operated; substantially as described.

57. The combination with a keyboard for setting up stops in different positions, of slide-bars for operating with said stops, means for rectilinearly moving said bars to a position of rest against the stops, type-carrying frames rigidly secured to said bars, and independently-movable type carried by said frames, substantially as described.

58. The combination with a keyboard for setting up stops in different positions, of slide-bars for operating with said stops, means for rectilinearly moving said bars to a position of rest against the stops, type-carrying frames rigidly secured to said bars, independently-movable type carried by said frames, and independently-movable type-hammers for operating with said type, substantially as described.

59. The combination with a keyboard for setting up stops in different positions, of slide-bars coöperating with said stops, means for moving said bars to a position of rest against said stops, type-carrying frames secured to said bars, independently-movable type arranged in said frames, independently-movable type-hammers coöperating with the type, pawls which are operated upon the movement of any of the type-frames to initially release the type-hammer common to that frame, and means for automatically releasing the type-hammers coöperating with type in frames of lower order, irrespective of whether said frames are actuated; substantially as described.

60. The combination with a keyboard for setting up stops in different positions, of slide-bars coöperating with said stops, type-frames movable with the slide-bars, independently-movable type carried by said frames, and spring-fingers, one of said fingers coöperating with a plurality of type in a frame which coöperate with the type in the printing-line; substantially as described.

61. The combination with a keyboard for setting up stops in different positions, of slide-bars which are arrested by said stops, type-frames movable with said key-bars, a series of independently-movable type arranged in each frame, and a single spring-finger coöperating with all of a series of type in a frame; substantially as described.

62. The combination with a keyboard for setting up different stops, of slide-bars carrying type-frames, a series of independently-movable type arranged in said frames, said type being formed with shoulders or lateral projections on their lower ends, and stationary spring-fingers which coöperate with said shoulders to return the actuated type to their normal position; substantially as described.

63. The combination with a keyboard for setting up stops, of slide-bars coöperating with said stops, type-frames carried by said slide-bars, a series of independently-movable type in each frame, lateral extensions at the lower ends of the type, a spring-finger for each series of type which is designed to ride over said extensions when the frame is moved, and type-hammers for driving the type in the printing-line against the resistance of said spring-fingers; substantially as described.

64. The combination with a keyboard for setting up stops, of sliding bars coöperating with said stops, type-frames carried by said sliding bars, independently-movable type arranged in said frame, independently-movable type-hammers for coöperating with said type, a pawl coöperating with each type-hammer, a track extension on each pawl which coöperates with a projection on each type-frame, an operating-handle, and means connected with said operating-handle to trip all of the released type-hammers; substantially as described.

65. The combination with a keyboard for setting up stops, of sliding bars coöperating with said stops, a series of type carried by said sliding bars, independently-movable type-hammers coöperating with said type, independently-movable pawls 150 coöperating with the type-hammers and with the sliding bars, whereby, whenever a sliding bar is actuated, its respective pawl is operated to release the type-hammer, pawls 157 coöperating with said type-hammers, an operating-handle, and connections between said operating-handle and said pawls 157, whereby, the type-hammers are fully released or tripped after the sliding bars and their carried type have completed their movement; substantially as described.

66. The combination with a keyboard for setting up stops, of sliding bars coöperating with said stops, independently-movable type carried by said bars, type-hammers for driving said type to make a printing impression, pawls 150 for locking the type-hammers in a retracted position, track extensions on said pawls, means on said sliding bars for coöperating with said track extensions to move the pawls whenever the sliding bars are moved, means on said pawls for actuating the next adjacent pawl of lower order, irrespective of whether its coöperating slide-bar is moved or not, pawls 157 for sustaining the type-hammers in a retracted position after said type-hammers have been released by the pawls 150, an operating-handle, and connections between said operating-handle and said pawls 150 to operate the latter when the handle reaches a certain position; substantially as described.

67. The combination with a keyboard for setting up stops, of slide-bars coöperating with said stops, type carried by said slide-bars, type-hammers coöperating with said type, pawls for sustaining and releasing said type-hammers, means on the slide-bars for operating said pawls, an operating-handle, handle-operated pawls for tripping the type-hammers when the handle is in a certain position, centering-racks carried by the sliding bars, a centering-bar coöperating with said racks, and connections between said centering-bar and the mechanism for operating the pawls 157, whereby said bar is thrown into an operative position before the pawls 157 are operated; substantially as described.

68. The combination with a keyboard for setting up stops, of sliding bars coöperating with said stops, type carried by said sliding bars, type-hammers coöperating with said type, centering-racks 166 carried by said sliding bars, a rocking frame, a centering-bar carried by said rocking frame for coöperating with said centering-racks, an operating-handle, and connections operated by said handle for releasing the type-hammers, said connections also rocking the frame carrying the centering-bar; substantially as described.

69. The combination with a series of independently-movable type-frames, of independently-movable type carried by said frames, independently-operable type-hammers coöperating with the type, two pawls for each of said type-hammers, one of said pawls being operated by the type-frame to initially release the type-hammer, and the other of said pawls being operated by connections from the operating-handle to finally release or trip the type-hammer, in order that said hammer may deliver an impacting blow against the type, a rocking frame carrying a cross-bar for coöperating with said last-mentioned pawls, said cross-bar also restoring the type-hammers to their normal position and setting the same for another operation, and an operating-handle for rocking said frame; substantially as described.

70. The combination with a movable type-frame carrying independently-movable type, of a type-hammer coöperating with said type, a pawl for holding the type-hammer in its retracted position, said pawl being operated whenever the type-frame is moved to release the type-hammer, a pawl for holding the type-hammer in its retracted position when so released, and a bar for operating said last-mentioned pawls to release the type-hammer, said bar also coöperating with the type-hammer to reset the same against the resistance of its driving-spring; substantially as described.

71. In a ribbon-feed, the combination with two spools on which the ribbon is wound, of ratchet-wheels on the shafts of said spools, pawls for said ratchet-wheels, and means which is operative when the full spool is held against further movement by the tension of the ribbon for disengaging the pawl coöperating with the ratchet of the full spool, and to engage a pawl with the ratchet of the empty spool; substantially as described.

72. In a ribbon-feed, the combination with spools to which the ends of an inking-ribbon are secured, of ratchets on the ends of the shafts of said spools, a sliding plate carrying two pawls designed to laterally engage said ratchets, means for vibrating said plate to cause the engaged pawl to rotate its ratchet and consequently wind the ribbon on its conjoined spool, and mechanism which is thrown into action when the wound spool is held against further movement by the tension or pull of the ribbon from the unwound spool, to disengage the pawl from the ratchet of the full spool, and engage the other pawl with the ratchet of the empty spool; substantially as described.

73. In a ribbon-feed, the combination with two spools on which an inking-ribbon is designed to be wound, of ratchets secured to the shafts of said spools, a vibrating frame-plate, a rotary element mounted on said frame-plate, two pawls mounted on said rotary element and designed to laterally engage the spool-ratchets, means for holding one or the other of said pawls in a position where it will properly coöperate with and drive its respective ratchet, and means for reversing the action of said pawls when the wound spool is held against further movement by unusual tension being placed upon the ribbon; substantially as described.

74. The combination with a ribbon, of feeding devices therefor, means for reversing the action of the feeding devices, and mechanism in the form of a vibrating plate carrying a plurality of pawls for automatically shifting the reversing means when the wound spool is held against further movement by unusual tension being placed upon the ribbon; substantially as described.

75. The combination with a platen and type, of means for feeding a sheet between the same, a printing-ribbon interposed between the type and sheet, and automatically-actuated devices for causing the ribbon to be fed first in one direction and then in the opposite direction, the reversal in the feed of the ribbon being accomplished when the wound spool is held against further movement by an unusual tension or pull being exerted upon the ribbon; substantially as described.

76. The combination with a series of type and a platen, of means for feeding a sheet of paper between the same, a printing-ribbon interposed between the type and sheet, automatically-actuated devices for causing the ribbon to be fed first in one direction and then in the opposite direction, said mechanism comprising a vibrating frame, a plurality of pawls carried by said frame, and devices which are operative when the wound spool is held against further movement by an unusual tension placed upon the ribbon for causing the pawls to alternately engage and drive their respective ribbon-winding mechanisms; substantially as described.

77. The combination with a ribbon, of spools to which the ends of said ribbon are secured, ratchets on the shafts of said spools, a vibrating plate, a rotary element mounted on said plate, two pawls carried by said rotary element, and designed to alternately engage their respective ratchets, said rotary element being actuated when the wound spool is held against further movement by an unusual tension placed upon the ribbon, and a centering device coöperating with said rotary element to hold it in the position in which it is placed after coöperation with the ratchet of the wound spool; substantially as described.

78. The combination with two spools, of a ribbon having its ends connected thereto, ratchets conjoined to said spools, a vibrating plate 175, a rotary element 176 mounted upon said plate, a spring-pressed centering-pawl 177 coöperating with said rotary element, pawls 179 and 180 mounted upon said rotary element and designed to alternately drive their respective ratchets, springs for holding said pawls in an operative position, and projections on said rotary element for coöperating with the pawls carried thereby, whereby when either end of the ribbon is placed under unusual tension, said rotary element is actuated to release the disengaged pawl and throw it into an operative position, to reverse the direction in which the ribbon is wound; substantially as described.

79. The combination with a ribbon, of feeding devices therefor, means for reversing the action of the feeding devices, mechanism for automatically shifting the reversing means under unusual tension upon the ribbon, and a yielding driver for said feeding devices; substantially as described.

80. The combination with a ribbon, of pawl-and-ratchet mechanisms affording feeding devices therefor, yielding means for operating said feeding devices, means for reversing the action of the feeding devices, and mechanism for automatically shifting the reversing means under unusual tension upon either end of the ribbon; substantially as described.

81. The combination with a ribbon, of feeding devices therefor in the form of pawl-and-ratchet mechanisms, which are alternately thrown into operative position to feed the ribbon in opposite directions, a vibrating plate upon which the pawls of said feeding mechanisms are mounted, a rock-shaft for vibrating said plate, a rock-arm loosely mounted upon said shaft, said rock-arm being locked against movement in one direction, and moving in the opposite direction against the tension of a spring, and means connected to said rock-arm for vibrating the same, substantially as described.

82. In a calculating-machine, the combination with two or more series of independent vertically-movable type, of means for bringing any one type of a series into position to print side by side with those of other series, a platen adapted to support a sheet of paper above said type and to be moved laterally across the top of the casing of the machine and set in different positions opposite the type, a hinged carriage in which said platen is mounted, devices for locking the platen and its carriage in any position in which it is set, means for intermittently moving the platen to feed the paper, whereby parallel columns may be printed upon the paper, and independently-movable type-hammers for the vertically-movable type; substantially as described.

83. In a machine of the character described, the combination with the printing-types and operating mechanism therefor, of an arm which is vibrated by said mechanism after each printing action, a laterally-adjustable carriage, a platen arranged in said carriage, a rocking frame carrying a rod coöperating with the vibrating arm in the different adjusted positions of the carriage, a ratchet-wheel conjoined to said platen, a pawl coöperating with said ratchet-wheel, and means for driving said pawl from said rocking frame; substantially as described.

84. The combination with a hinged carriage, of a platen-roller mounted therein, means for driving said platen-roller step by step, a track for supporting the free end of said carriage, means on the carriage for coöperating with the track for locking said carriage in different laterally-adjusted positions, a pivoted frame carrying a track 213, on which the rear end of the carriage is slidingly and pivotally mounted, and means for vertically adjusting said frame; substantially as described.

85. The combination with a hinged carriage, of a platen mounted therein, a track-roller arranged in the front end of the carriage, a notched track with which said roller coöperates, a latch-pin coöperating with the notches in the track, and a handle on said latch-pin by which said carriage may be lifted; substantially as described.

86. The combination with a pivoted track 213, of a carriage slidingly and pivotally mounted on said track, a platen arranged in said carriage, means for locking said carriage and its platen in laterally-adjusted positions, a support for the free end of the carriage, and means for adjusting the height of the track 213; substantially as described.

87. The combination with a pivoted track 213, of means for adjusting the height of same, a carriage slidingly and pivotally mounted on said track, a notched rail for supporting the free end of the carriage, a platen mounted in the carriage, and means on said carriage for coöperating with the notches in the rail to lock said carriage in different laterally-adjusted positions; substantially as described.

88. The combination with a pivoted carriage-section, of a bracket secured to said section for supporting a roll of paper, a carriage pivoted to said section, and a platen-roller mounted in said carriage, said carriage and its platen-roller being laterally adjustable relative to said pivoted section; substantially as described.

89. The combination with printing-type, of a platen-roller, oppositely-arranged ratchet-wheels conjoined thereto, pawls for said ratchet-wheels, one of which is a driving-pawl, and means for operating the other of said pawls from the driving-pawl to render said other pawl inoperative whenever the driving-pawl moves to a position to drive its ratchet, said other pawl moving in position to limit the movement imparted by the driving-pawl to the ratchet; substantially as described.

90. The combination with a platen, of oppositely-disposed ratchet-wheels conjoined thereto, a driving-pawl coöperating with one of said ratchet-wheels, and a stop-pawl coöperating with the other of said ratchet-wheels for determining the extent of motion imparted by the driving-pawl; substantially as described.

91. The combination with a platen, of oppositely-arranged ratchet-wheels conjoined thereto, a driving-pawl coöperating with one of the ratchet-wheels, a stop-pawl which is lifted by said driving-pawl in its initial movement to release its ratchet-wheel so as to permit the driving-pawl to operate its respective ratchet-wheel, said auxiliary pawl being released after the driving-pawl is in a driving position to arrest or limit the movement imparted by the driving-pawl; substantially as described.

92. The combination with a platen, of oppositely-arranged ratchet-wheels 202 and 202$^a$, a driving-pawl 203 coöperating with the ratchet-wheel 202, an auxiliary or stop pawl 203$^a$ coöperating with the pawl 203 and the ratchet-wheel 202$^a$, and means for throwing the stop-pawl out of engagement with its respective ratchet-wheel whenever the driving-pawl is turned out of engagement with its ratchet-wheel; substantially as described.

93. The combination with printing-type, of an inking-ribbon normally in printing-line of said type, an inking-ribbon of different color in juxtaposition to the printing-line, means for shifting the positions of said ribbons and a spring for returning said ribbons to their normal position; substantially as described.

94. The combination with printing-type, of a ribbon which normally occupies a position across the printing-line of said type, a ribbon of different color arranged parallel with said first-mentioned ribbon, feeding devices common to both ribbons, a shifting mechanism for positively transposing said ribbons and a spring for returning said ribbons to their normal positions; substantially as described.

95. The combination with twin spools, one of which carries a ribbon of one color normally in printing-line, and the other of which carries a ribbon of a different color normally out of printing-line, of feeding mechanism for said spools, means for positively effecting the transposition of said ribbons, and a spring coöperating with said transposing mechanism for returning the ribbons to their normal positions whenever said spring is free to act; substantially as described.

96. In a calculating-machine, the combination with a recording mechanism, in which are included inking-ribbons of different colors, one of said ribbons normally occupying a position opposite the printing-line, of a total key or lever, mechanism connected to said total key or lever for positively moving said ribbons in one direction for effecting the transposition thereof, and a spring connected to said mechanism for restoring the ribbons to their normal position when the transposing mechanism is released by the total-key; substantially as described.

97. In a calculating-machine, the combination with adding and recording mechanisms, of a total key or lever coöperating therewith, an operating-handle for driving said recording and adding mechanisms, inking-ribbons of different colors which are included in the recording mechanism, and mechanism connected to and operated by the total key or lever, whereby, when said lever is moved to one position and the handle operated to cause the recording mechanism to print a total, the ribbons are transposed, and the total is printed in a color different from the items of which it is composed; substantially as described.

98. In a calculating-machine, the combination with adding and recording mechanisms, of an operating-handle for driving said mechanisms, a total-key, connections for printing the total of the sum in the adding mechanism through the instrumentality of the recording mechanism, and means for printing such a total in a color different from that of the items of which it is composed.

99. The combination with printing-type, of an inking-ribbon normally in the printing-line thereof, an inking-ribbon of different color in juxtaposition to said first-mentioned ribbon, and mechanism for transposing said ribbons, said mechanism comprising levers 127, 129, and 222, a rock-shaft provided with rock-arms having link connections with the spools upon which the ribbons are wound, and a link 221 connected with the lever 222, for rocking said shaft; substantially as described.

100. In a calculating-machine, the combination with a series of independently-movable printing-type, of an inking-ribbon normally in position across the printing-line of said type, an inking-ribbon of different color in juxtaposition to said first-mentioned ribbon, means for feeding said ribbons, a lever 127 arranged externally the machine, and connections between said lever and said ribbons, said connections comprising a lever 129, a lever 222 having one end resting upon the lever 129, a spring 223 for holding the end of lever 222 against lever 129, a rock-shaft, and a link connection between lever 222 and said rock-shaft; substantially as described.

101. The combination with twin ribbon-spools, of different-colored ribbons wound thereon, shafts upon which said spools are slidingly mounted, feeding mechanism for said ribbons, shifting mechanism for sliding the spools along their respective shafts and transposing said ribbons, and means within reach of the operator for positively actuating said shifting mechanism in one direction only; substantially as described.

102. The combination with a plurality of ribbon-spools containing different-colored ribbons, of frames containing said spools, shafts upon which said spools and frames are slidingly mounted, a rock-shaft carrying arms connected by links to said frames, means under control of the operator for positively rocking said shaft in one direction for transposing said ribbons and a spring for returning said rock-shaft and its parts to their normal positions; substantially as described.

103. The combination with sliding frames, of ribbon-spools carried thereby, guide-rollers for the ribbons mounted in said frames, different-colored ribbons wound on said spools, guide-rods 215 for said frames, said guide-rods also forming spindles for the guide-rollers, and means under the control of the operator for sliding said frames to transpose said ribbons; substantially as described.

104. The combination with sliding frames, of suitable guide-rods therefor, ribbon-spools carried by said frames, guide-rollers for the ribbons mounted in said frames, rock-arms mounted on a suitable shaft connected by links to said frames, a total-key, and connections between said total-key and said rock-shaft, whereby, when said total-key is in different positions, said ribbons are transposed; substantially as described.

105. The combination with a series of independently-movable type, of a plurality of inking-ribbons, means for shifting said ribbons so that one or another will occupy a position across the printing-line, feeding devices common to all of said ribbons, means for reversing the action of the feeding devices, and mechanism for automatically shifting the reversing means when either of the wound spools is held against further movement by unusual tension being placed upon its respective ribbon; substantially as described.

In testimony whereof I hereunto affix my signature, in the presence of two witnesses, this 29th day of March, 1900.

FRANK C. RINSCHE.

Witnesses:
WM. A. SCOTT,
RALPH KALISH.